(12) United States Patent
Stewart et al.

(10) Patent No.: US 7,105,976 B2
(45) Date of Patent: Sep. 12, 2006

(54) ELECTRIC MACHINES AND METHODS RELATED TO ASSEMBLING ELECTRIC MACHINES

(75) Inventors: William P. Stewart, Saint Peters, MO (US); Raymond D. Heilman, Florissant, MO (US); Charles P. Ketterer, Weybridge (GB); Paul G. Michaels, Saint Louis, MO (US); Donald J. Williams, Pierron, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/958,213

(22) Filed: Oct. 4, 2004

(65) Prior Publication Data

US 2006/0071565 A1    Apr. 6, 2006

(51) Int. Cl.
*H02K 3/52* (2006.01)
*H02K 5/15* (2006.01)
*H02K 11/00* (2006.01)

(52) U.S. Cl. .............. 310/218; 310/68 R; 310/71; 310/89; 310/90; 310/179; 310/254

(58) Field of Classification Search .......... 310/71, 310/89, 90, 216, 217, 218, 179, 254, 68 R
See application file for complete search history.

(56) References Cited

U.S. PATENT DOCUMENTS

| | | | |
|---|---|---|---|
| 4,758,755 A | | 7/1988 | Sherman et al. |
| 4,850,193 A | * | 7/1989 | Kawamura .................. 60/608 |
| 5,059,042 A | | 10/1991 | Grierson |
| 5,199,171 A | | 4/1993 | Umezawa et al. |
| 5,638,796 A | | 6/1997 | Adams, III et al. |
| 6,065,760 A | * | 5/2000 | Weygandt ................ 280/11.19 |
| 6,404,095 B1 | * | 6/2002 | Hsu ............................ 310/254 |
| 6,583,530 B1 | * | 6/2003 | Hsu ............................ 310/254 |
| 6,651,633 B1 | * | 11/2003 | Jones ......................... 123/559.1 |
| 6,713,916 B1 | | 3/2004 | Williams et al. |
| 2002/0011755 A1 | | 1/2002 | Shteynberg et al. |
| 2004/0183388 A1 | * | 9/2004 | Rittmeyer .................... 310/179 |

FOREIGN PATENT DOCUMENTS

| | | |
|---|---|---|
| DE | 19935723 | 10/2000 |
| EP | 1 367 699 A2 | 12/2003 |
| WO | WO 99/33158 | 7/1999 |

(Continued)

OTHER PUBLICATIONS

Design of a High Speed Switched Reluctance Machine for Automotive Turbo-Generator Applications; S.D. Calverly, et al; University of Sheffield; SAE Technical Paper Series 1999-01-2933; Aug. 17-19, 1999, pp. 1-10.

(Continued)

*Primary Examiner*—Darren Schuberg
*Assistant Examiner*—David W. Scheuermann
(74) *Attorney, Agent, or Firm*—Harness, Dickey & Pierce P.L.C.

(57) ABSTRACT

An electric machine includes a housing, an end shield, a stator, and a rotor assembly. The end shield can define at least one pin, and the stator can define at least one track. The stator can be positioned on the end shield such that the pin is received within the track. The stator can be captured between the end shield and a stop within the housing. The rotor assembly can include an adaptor sleeve and/or a bearing with a plurality of steel rolling elements. End caps can be coupled to the stator, and power and control electronics can be integrated within the housing.

21 Claims, 28 Drawing Sheets

FOREIGN PATENT DOCUMENTS

| | | |
|---|---|---|
| WO | WO 03/021746 A1 | 3/2003 |
| WO | WO 03/096515 A1 | 11/2003 |
| WO | WO 04/004098 A1 | 1/2004 |
| WO | WO 05/085611 A1 | 9/2005 |

OTHER PUBLICATIONS

Aerodynamic Losses in Switched Reluctance Machines; S.D. Calverley, et al; IEE Proc.-Electr. Power Appl., vol. 147, No. 6, Nov. 2000; pp. 443-448.

U.S. Appl. No. 10/958,196 for Apparatus and Methods of Retaining a Stator Within a Housing of an Electric Machine, filed Oct. 4, 2004, Stewart.

U.S. Appl. No. 10/958,197 for End Shields and Stators and Related Methods of Assembly, filed Oct. 4, 2004, Stewart.

U.S. Appl. No. 10/958,198 for Electric Machines and Methods Related to Assembling Elect, filed Oct. 4, 2004, Stewart et al.

U.S. Appl. No. 10/958,199 for Bearing Systems for Electric Machines, Oct. 4, 2004, Stewart et al.

U.S. Appl. No. 10/958,214 for Electric Machine With Power and Control Electronics Integrated Into the Primary Machine Housing, filed Oct. 4, 2004, Stewart et al.

U.S. Appl. No. 10/958,215 for Stator End Caps and Methods for Positioning the Lead and Exit Ends of the Stator Windings, filed Oct. 4, 2004, Stewart et al.

U.S. Appl. No. 29/214,510 for Exterior of an Electric Machine Housing, Oct. 4, 2004, Stewart et al.

Visteon Partners in Technology; European Automotive Design; Oct. 2002; pp. 30-43.

* cited by examiner

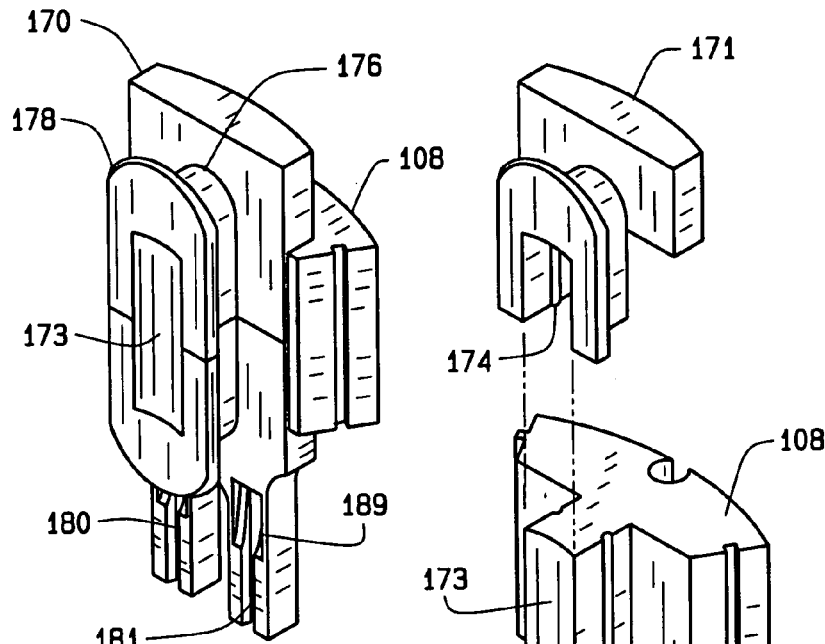
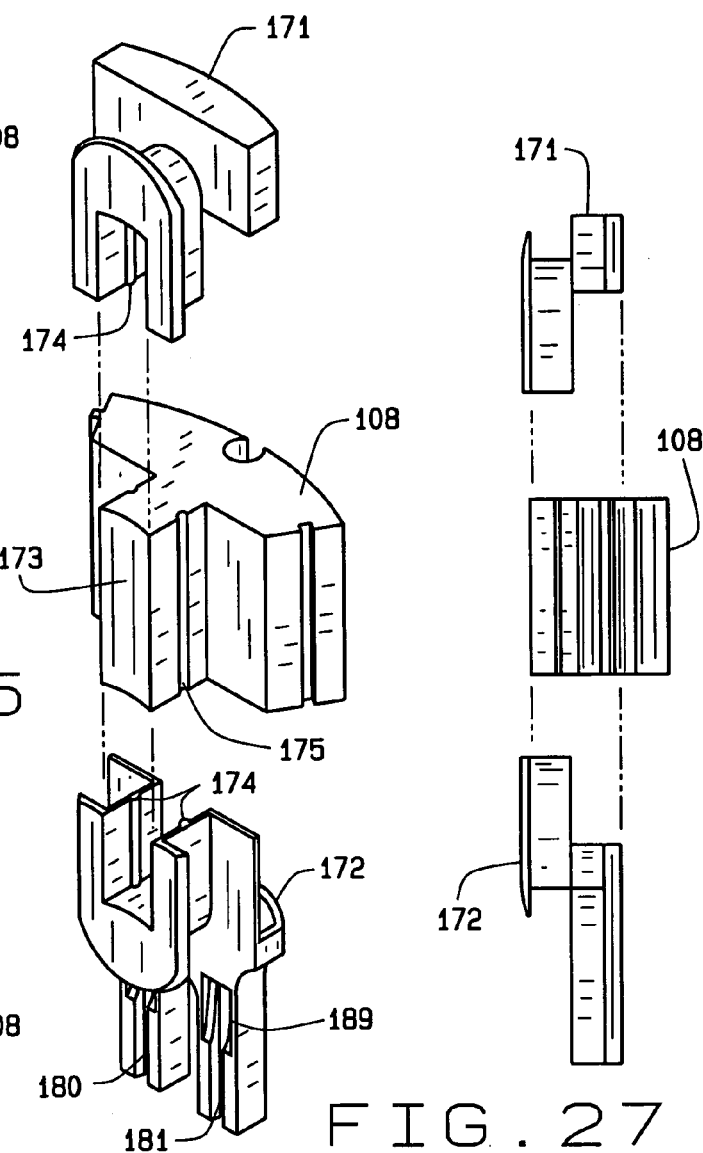
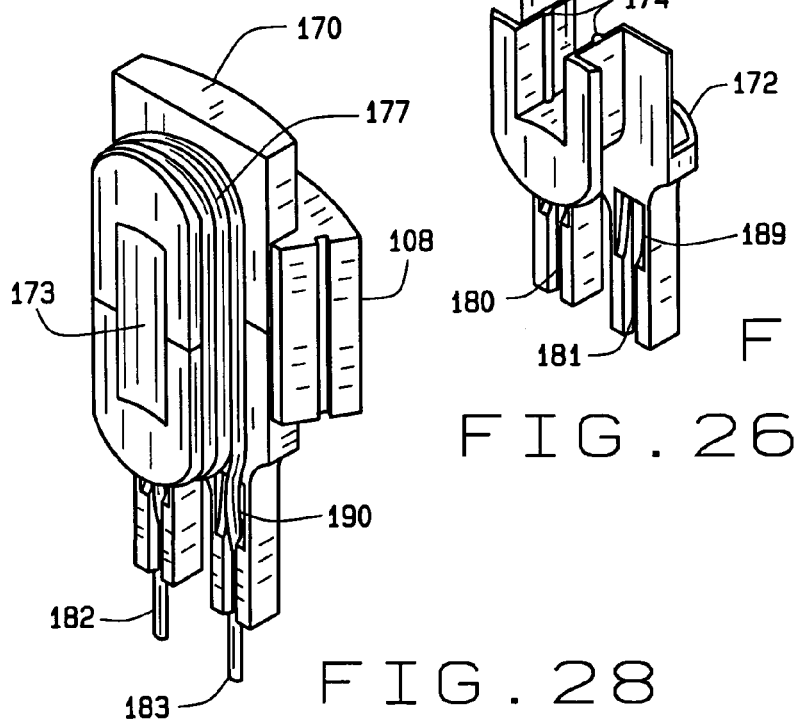
FIG. 25
FIG. 26
FIG. 27
FIG. 28

ELECTRIC MACHINES AND METHODS RELATED TO ASSEMBLING ELECTRIC MACHINES

FIELD

The present invention generally relates to electric machines, and more particularly (but not exclusively) to apparatus and methods related to assembling electric machines, such as electric superchargers.

BACKGROUND

Traditional assembly processes for electric machines include multiple discrete processes each designed to individually assemble a different component for the machine. With these multiple processes, alternate attachment means and additional components (e.g., fasteners) are generally required for each of the individual components. For example, stators are commonly pressed or bolted to a housing, then the end shield is bolted to the housing, and finally the rotor assembly is coupled to the housing. Regardless of the particular sequence in which these components are separately assembled to the housing, having these separate assembly operations tends to make the assembly process less efficient and more costly.

SUMMARY

In one implementation, an electric machine includes a housing, an end shield defining at least one pin, and a stator defining at least one track. The stator is positioned on the end shield such that the pin is received within the track. The stator is captured between the end shield and a stop within the housing. The stop and the end shield restrain movement of the stator relative to the housing independent of mechanical fasteners.

In another implementation, an electric machine includes a housing, a rotor assembly, an end shield, and a stator. The housing defines at least one stop therein and an opening. The rotor assembly includes at least one bearing having an outer race sized smaller than the opening defined by the housing. An adaptor sleeve is disposed generally around the outer race. The adaptor sleeve is disposed within the opening and forms an interference fit with the housing. This interference fit secures the adaptor sleeve within the opening defined by the housing independent of mechanical fasteners. The stator is captured between the end shield and the stop within the housing. The stop and the end shield restrain movement of the stator relative to the housing independent of mechanical fasteners.

In another implementation, an electric machine includes a housing, power and control electronics within the housing, and a stator within the housing. An end shield is coupled to the housing and defines at least one opening therethrough. At least one end cap is coupled to the stator and defines first and second grooves. The first and second grooves respectively engage the stator winding's lead and exit ends. The end cap guides the lead and exit ends through the opening in the end shield for connection to one or more of the power and control electronics.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 25 is a perspective view of an end cap coupled to a stator segment shown in FIG. 1;

FIG. 26 is an exploded perspective view of the end cap pieces aligned for engagement with the stator segment shown in FIG. 25;

FIG. 27 is a side elevation view of the end cap and stator segment shown in FIG. 26;

FIG. 28 is a perspective view of the end cap and stator segment shown in FIG. 25 and also showing a stator winding;

Corresponding reference numerals indicate corresponding parts throughout the several views of the drawings.

DETAILED DESCRIPTION OF THE EXEMPLARY EMBODIMENTS

The following description of the exemplary embodiments is merely exemplary in nature and is in no way intended to limit the invention, its application, or uses.

Figure 1:
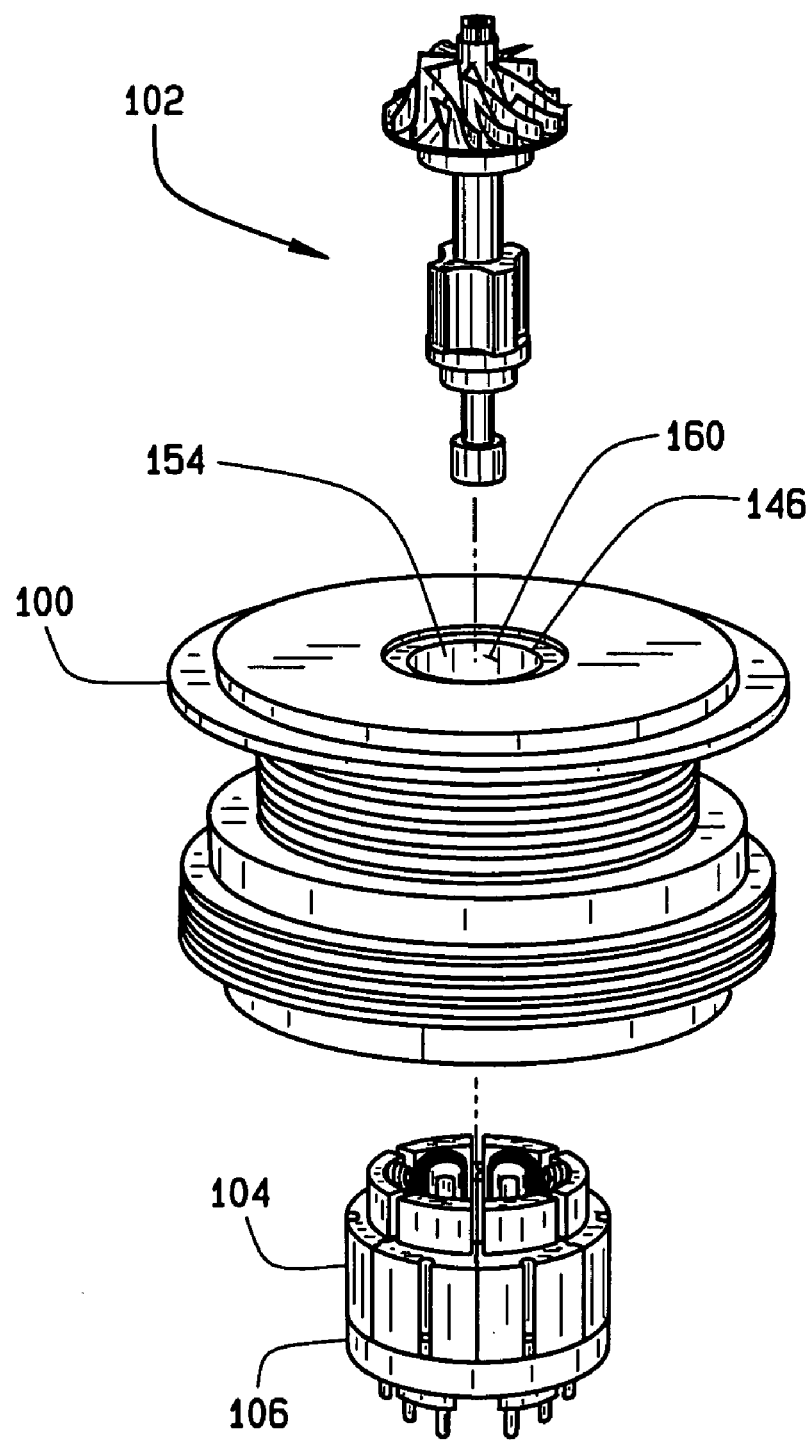
FIG. 1 is a perspective view of a rotor assembly, segmented stator, end shield, and housing according to an exemplary embodiment of the invention.
Figure 2:
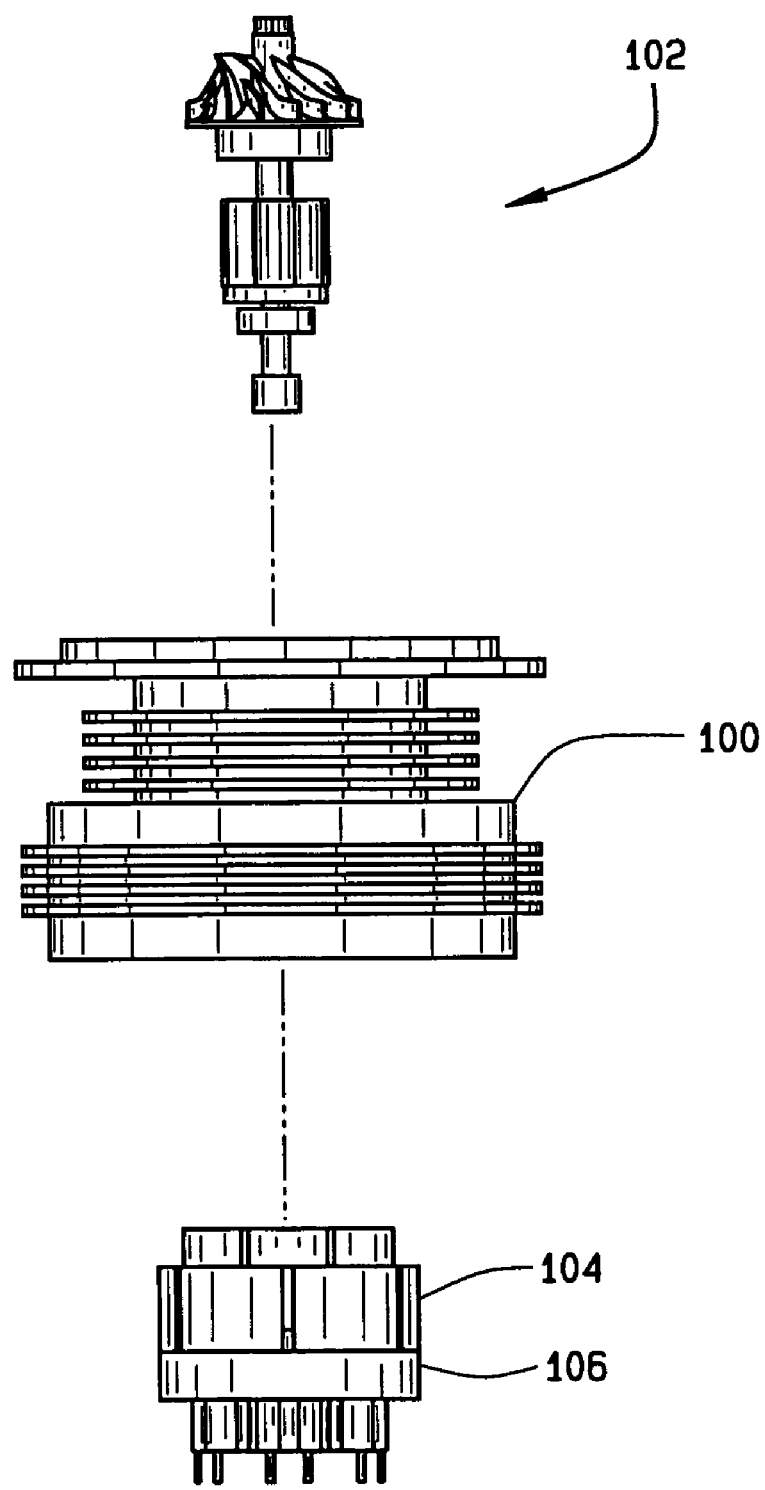
FIG. 2 is an elevation view of the components shown in FIG. 1.

Referring now to FIGS. 1 and 2, there is shown an exemplary housing 100, rotor assembly 102, circumferentially segmented stator 104, and end shield 106 in accordance with the principles of this invention. As shown, the rotor assembly 102 is aligned to be engaged with the housing 100. The stator 104 and the end shield 106 are also aligned for positioning within the housing 100.

In various implementations, the stator 104 and end shield 106 can include integral assembly features that enable the stator segments 108 to be assembled on the end shield 106 without the need for supplemental restraints, secondary fixtures, or retaining bands. After the stator 104 has been assembled on the end shield 106, the stator 104 can then be positioned within the housing 100 along with (not separately from) the end shield 106, thereby streamlining the assembly process by reducing the number of discrete operations.

Figure 8:
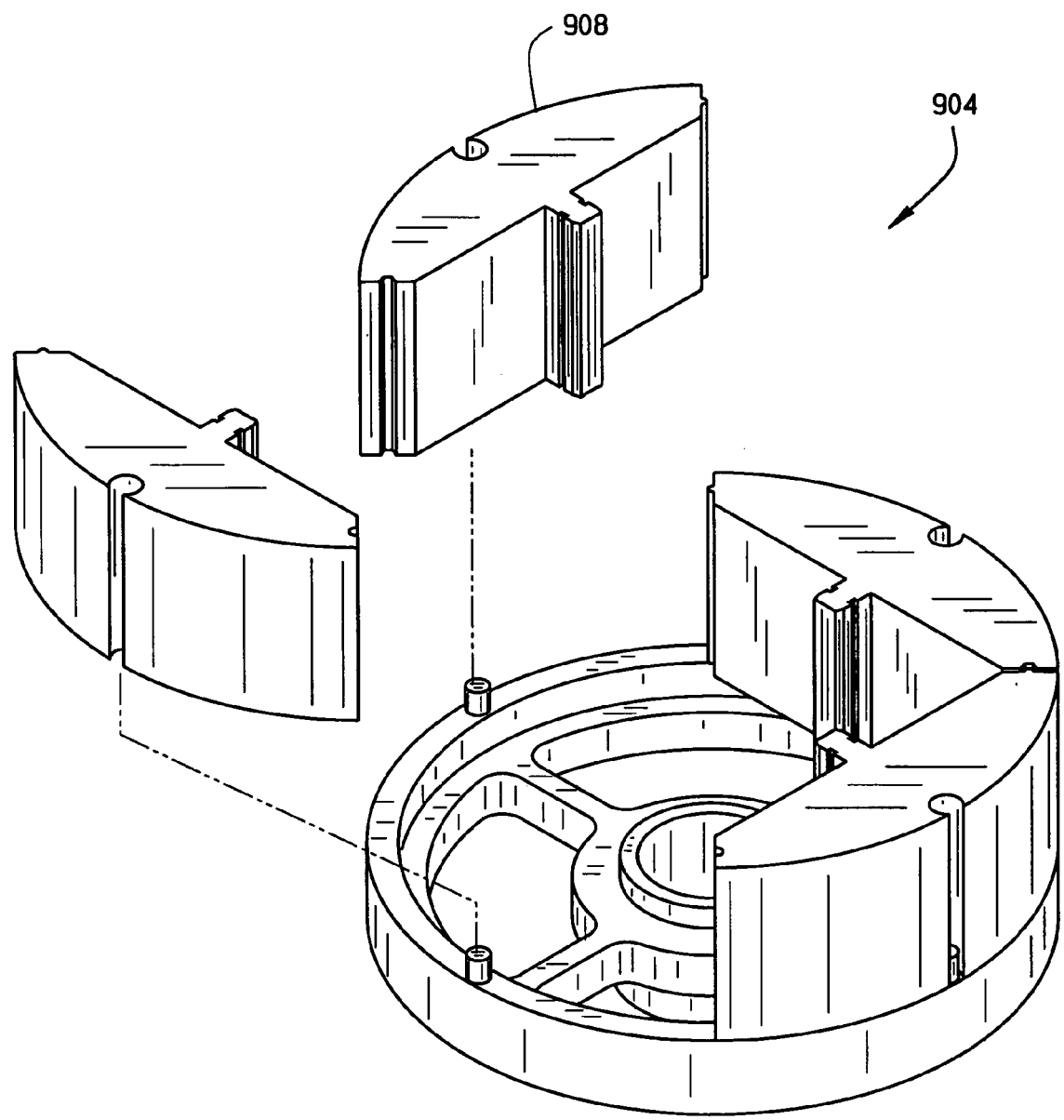
FIG. 8 is a partially exploded perspective view of unwound stator segments being positioned on an end shield according to an exemplary embodiment of the invention.
Figure 9:
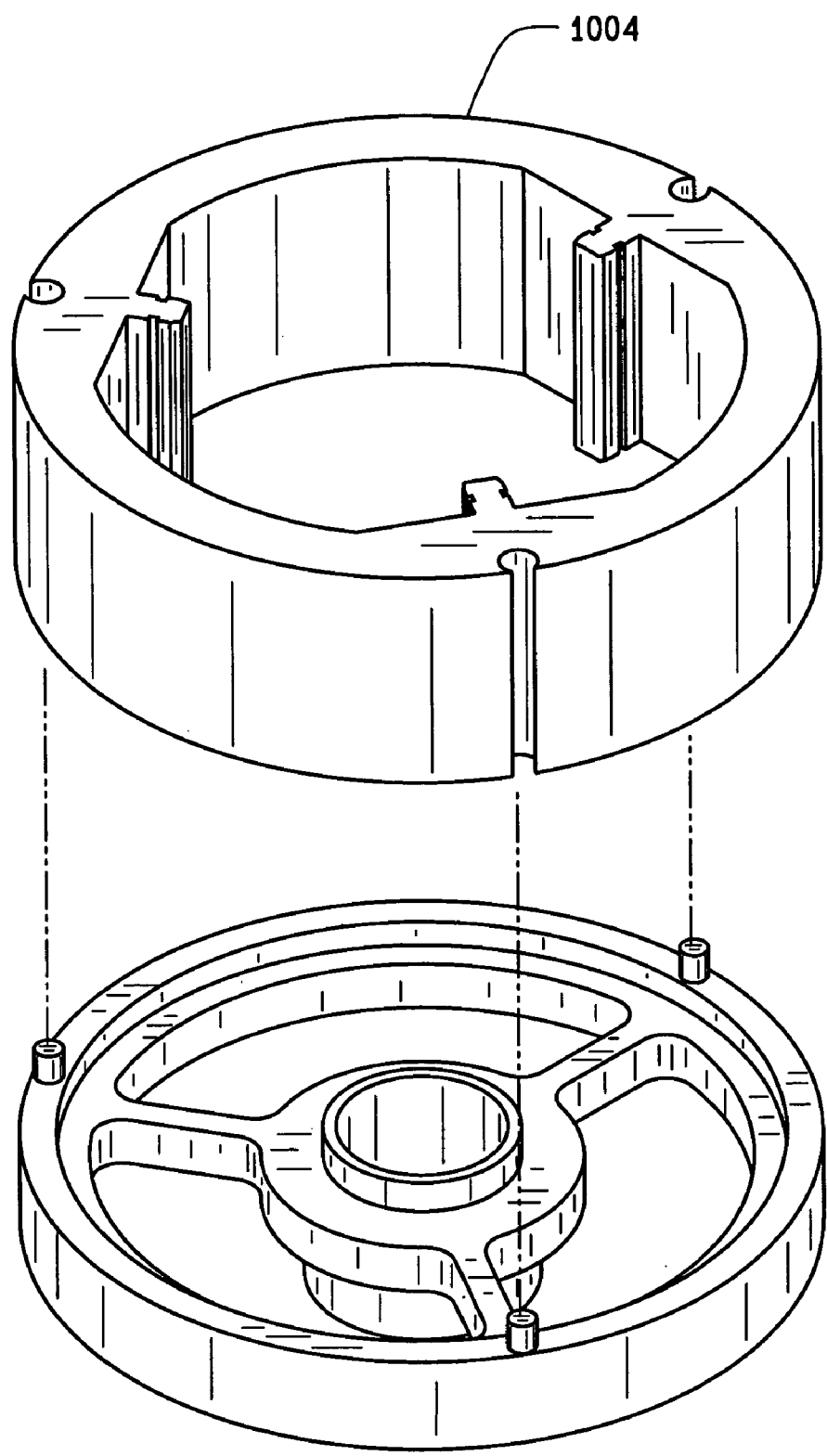
FIG. 9 is an exploded perspective view of an unwound non-segmented stator and an end shield according to an exemplary embodiment of the invention.

As shown in FIGS. 1 through 7, the stator 104 includes six stator segments or teeth 108. Alternative embodiments, however, can include segmented stators having more or less than six stator segments depending on the particular application. For example, FIG. 8 illustrates an exemplary segmented stator 904 that includes four stator segments 908. In other embodiments, the stator does not need to be segmented such as the exemplary non-segmented or full round stator 1004 shown in FIG. 9.

With further reference to FIGS. 3 through 7, each stator segment 108 defines a track 110. The tracks 110 are each sized to slidably receive therein a corresponding pin 112 defined by the end shield 106.

Figure 3:
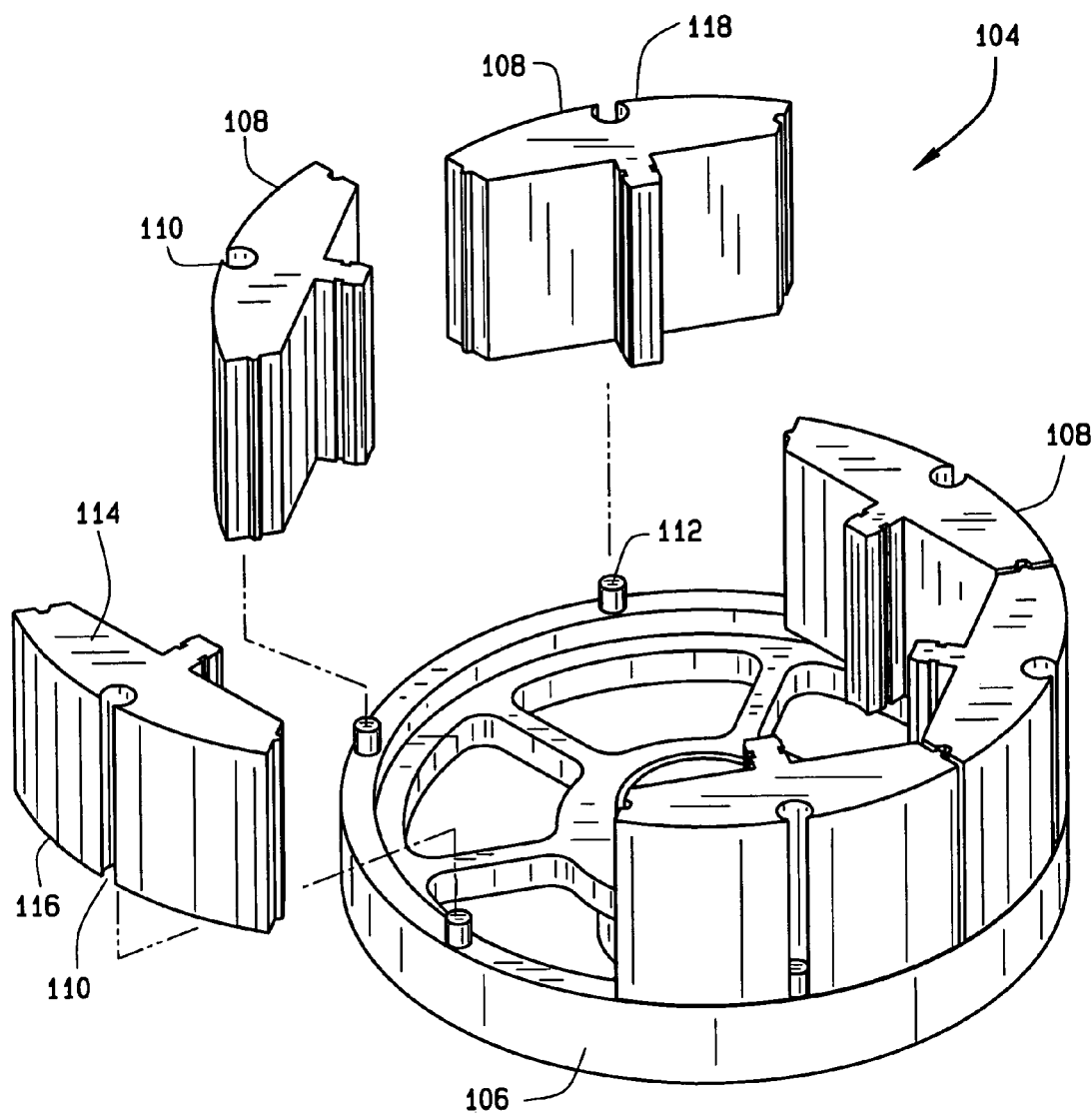
FIG. 3 is a partially exploded perspective view of the unwound stator segments being positioned on the end shield shown in FIG. 1.

While FIG. 3 shows each stator segment 108 with only one track 110 and shows the end shield 106 defining only one pin 112 for each stator segment 108, such is not required. Other embodiments can include stator segments having one or more tracks depending on the particular application and arrangement of the pins. In yet other embodiments, the stator segments may each define one or more pins (instead of or in addition to tracks) sized to be slidably received within tracks defined by the end shield. In still further embodiments, different combinations of pins and tracks can be defined by either or both the stator segments and the end shield depending on the particular application.

For clarity, FIG. 3 shows unwound stator segments 108 (without end caps and stator windings) being assembled on the end shield 106. In various implementations, however, end caps 170 and windings 177 (FIG. 28) are coupled to the stator segments 108 before the stator segments 108 are assembled on the end shield 106. The wound stator segments 108 together with the end caps 170 and windings 177 are then assembled on the end shield 106. Alternatively, other implementations can include assembling the unwound stator segments on the end shield, and then coupling the end caps and windings to the stator segments.

In the illustrated embodiment of FIG. 3, each track 110 extends along the entire length (i.e., from the first end 114 to the second end 116) of the outer side surface 118 of the corresponding stator segment 108. In this exemplary manner, the pins 112 can thus be received within the tracks 110 from either end 114 or 116. Alternative embodiment can include one or more of the stator segments 108 defining tracks that do not extend the entire length of the outer side surface 118.

Each track 110 is shown with a generally c-shaped cross section having an open side portion. Alternatively, other cross-sectional shapes can be employed for the tracks such as rectangular, triangular, ovular, full circular, combinations thereof, among others. For example, one or more stator segments can define tracks having a generally circular but closed cross section.

Figure 4:
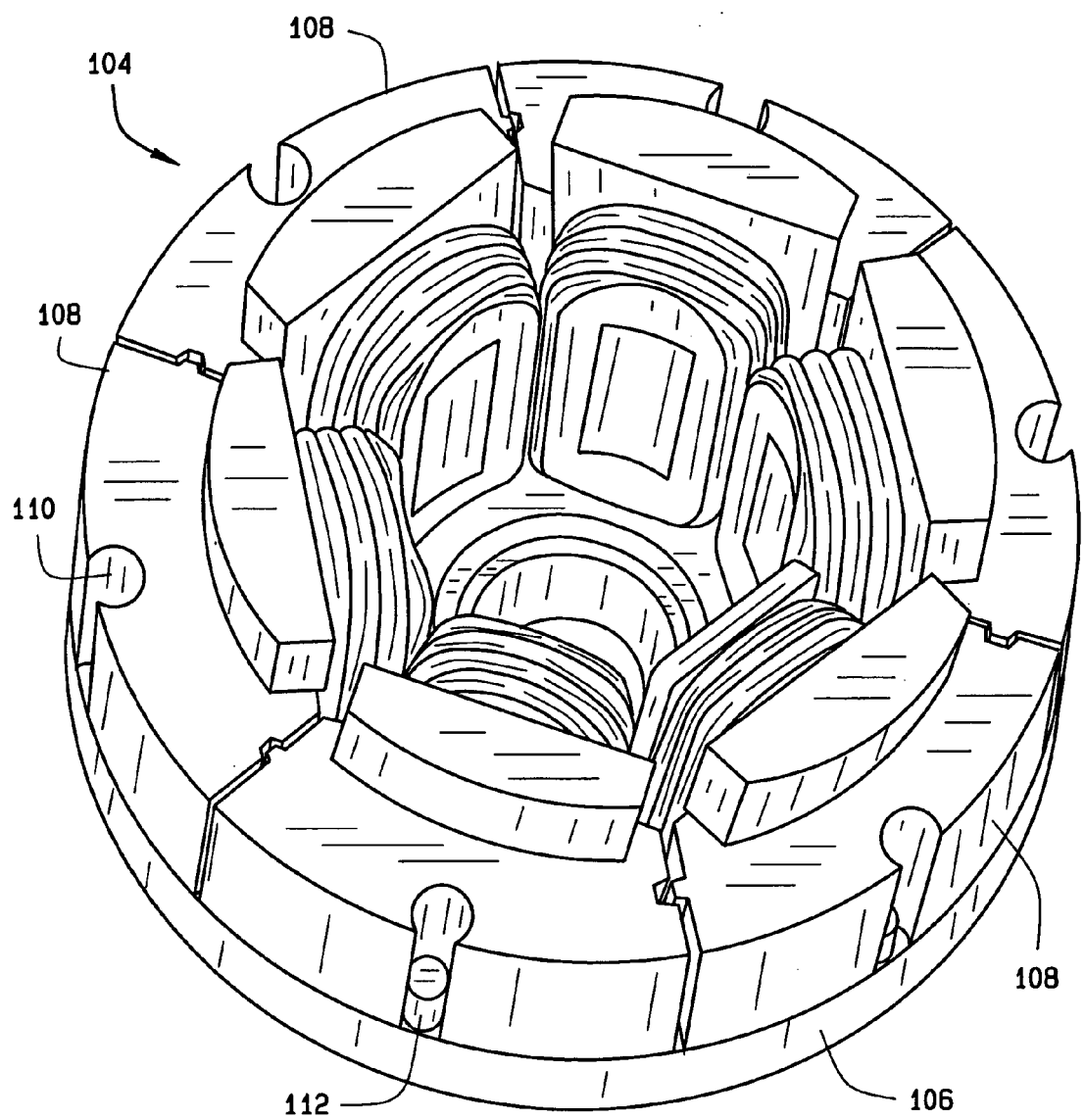
FIG. 4 is a perspective view of the segmented stator and the end shield shown in FIG. 1.
Figure 7:
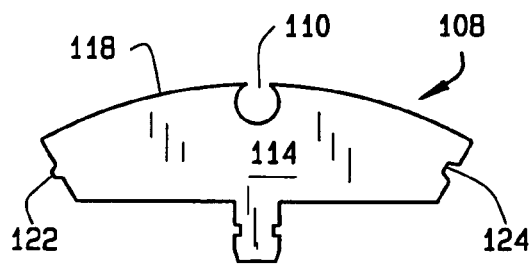
FIG. 7 is a plan view of an unwound stator segment shown in FIG. 6.

As shown in FIGS. 4 and 7, each stator segment 108 also defines a ridge 122 and a groove 124. Each stator segment 108 can be positioned on the end shield 106 between two other stator segments with the groove 124 and ridge 122 of each stator segment 108 being respectively engaged with another stator segment's ridge along one side, and one other stator segment's groove along the other side. Aspects of the invention, however, are not limited to the particular groove and ridge arrangement shown in the figures.

Each pin 112 defined by the end shield 106 includes a substantially circular cross section. Alternatively, other cross-sectional shapes can be employed for the pins depending on the particular configuration of the tracks into which the pins are received. For example, other embodiments can include one or more pins having a non-circular cross section such as rectangular, triangular, ovular, combinations thereof, among others.

In various implementations, the end shield 106 and the pins 112 can be integrally or monolithically formed as a single component. One exemplary implementation integrally casts the end shield 106 and the pins 112 as a single component. Other suitable manufacturing processes besides casting can also be used to integrally form the end shield 106 and the pins 112 as a single component including molding, machining, powder metal technology, etc.

Even though the pins 112 can be formed integrally with the end shield 106, such is not required. In other embodiments, the pins 112 may comprise discrete components that are separately engaged to the end shield 106, for example, by press fitting, welding, threads, among other suitable methods. In those embodiments in which one or more stator segments define pins, such pins can be separate components that are separately engaged to the stator segments.

A wide range of materials may be used for the end shield 106 and the pins 112. In those implementations in which the end shield 106 and pins 112 are integrally formed as a single component, the end shield 106 and pins 112 can be formed from the same material, such as aluminum, aluminum alloys, etc. In embodiments in which the pins 112 and the end shield 106 are separate components, however, the pins 112 and the end shield 106 may be formed of different or dissimilar materials.

The tracks 110 and pins 112 are preferably configured so as to provide a means for at least inhibiting relative rotational movement between the stator 104 and the end shield 106. That is, the tracks 110 and pins 112 are configured (e.g., shaped, sized, formed of suitable materials, etc.) such that the engagement of the pins 112 within the tracks 110 at least inhibits rotation of the stator segments 108 relative to the end shield 106, and thus helping to maintain sensor alignment. The engagement of the pins 112 within the tracks 110 can also provide a hard stop or secondary retention feature, for example, if a circumferential interference fit between the stator 104 and the housing 100 is lost (e.g., due to thermal expansion, etc.).

In addition, engaging the tracks 110 with the pins 112 can help with positioning and assembling the stator segments 108 on the end shield 106, which can be done manually, via full automation, or a combination thereof depending on the particular application. That is, the end shield 106 and pins 112 can support and help control the position of the stator segments 108 while they are being assembled and also during operation of the electric machine. And, when the pins 112 are within the tracks 110, the end shield 106 effectively becomes part of the stator subassembly such that the end shield 106 can be positioned along with the stator 104 into the housing 100. This, in turn, can streamline the assembly process by reducing the need to separately position the stator 104 and then the end shield 106 within the housing 100.

Because the stator's position should be maintained both axially and radially relative to the housing during operation, many existing applications retain the stator position by using mechanical fasteners and/or through a circumferential interference fit between the stator and the housing. For example, some applications capture the stator between two end shields, which, are, in turn, bolted to one another. This bolting, however, usually requires a clearance fit to the housing, which can reduce thermal efficiency. And maintaining a circumferential interference fit between a stator and a housing can be difficult across the large operating temperature ranges of electric machines especially when the housing and stator have significantly different coefficients of thermal expansion.

In various implementations of the present invention, however, the stator is captured between the end shield and a stop within the housing such that the stator's position can be retained without mechanical fasteners (e.g., bolts for the stator and/or end shield, etc.) and without a circumferential interference fit between the stator and the housing. This, in turn, enables greater control of concentricity between the stator, end shield, and housing than when stator position is maintained solely by a circumferential interference fit between the stator and the housing especially when that circumferential interference fit can be influenced by temperature.

As shown in FIGS. 10 through 13, the housing 100 defines an internal stop 126 configured to maintain contact with the stator 104 even during operation of the machine to thereby restrain movement of the stator 104 relative to the housing 100. In the illustrated embodiment, the stop 126 is an internal shoulder configured to abut against an end portion 128 of the stator 104.

Figure 10:
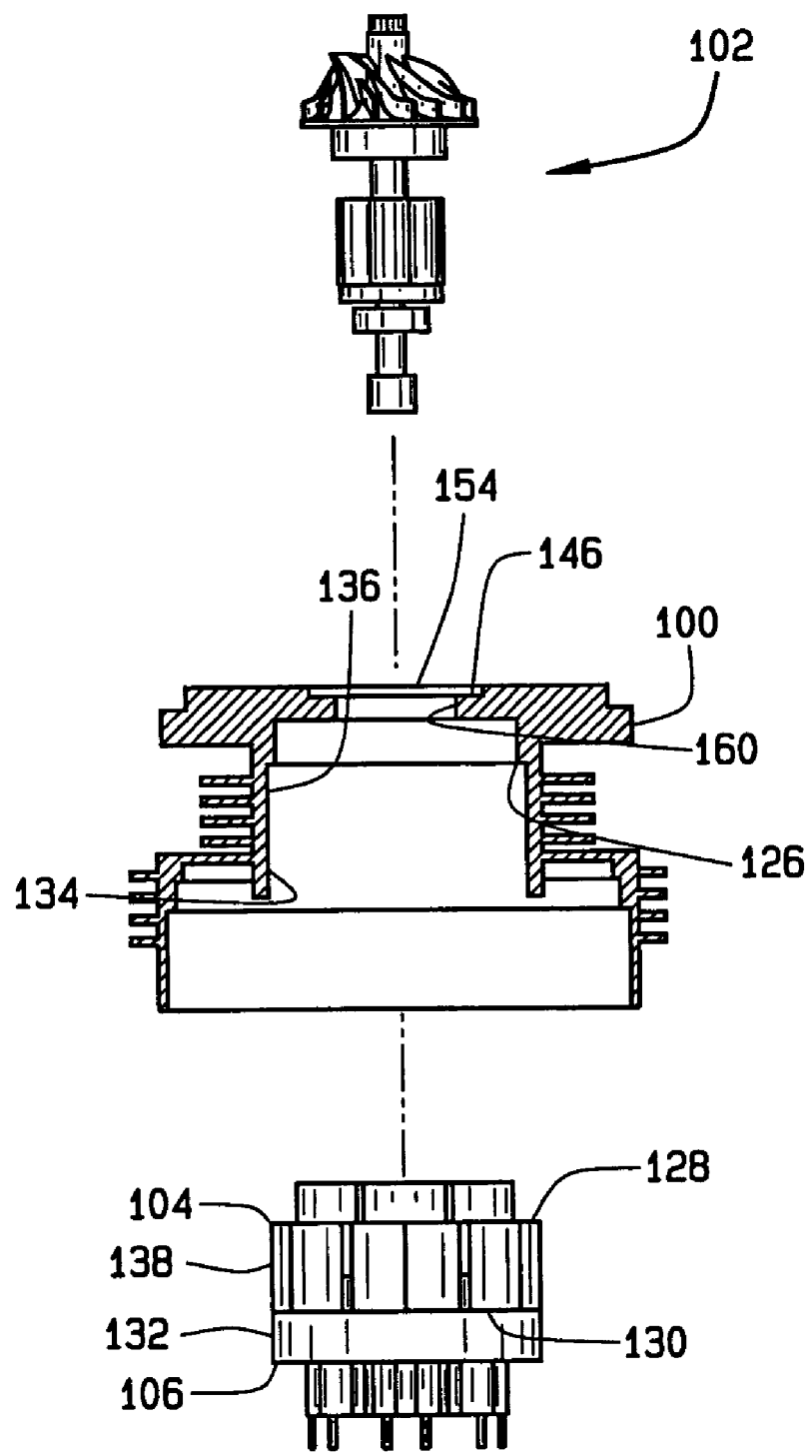
FIG. 10 is an exploded view showing the segmented stator, end shield, and housing (cross-section) shown in FIG. 1.
Figure 11:
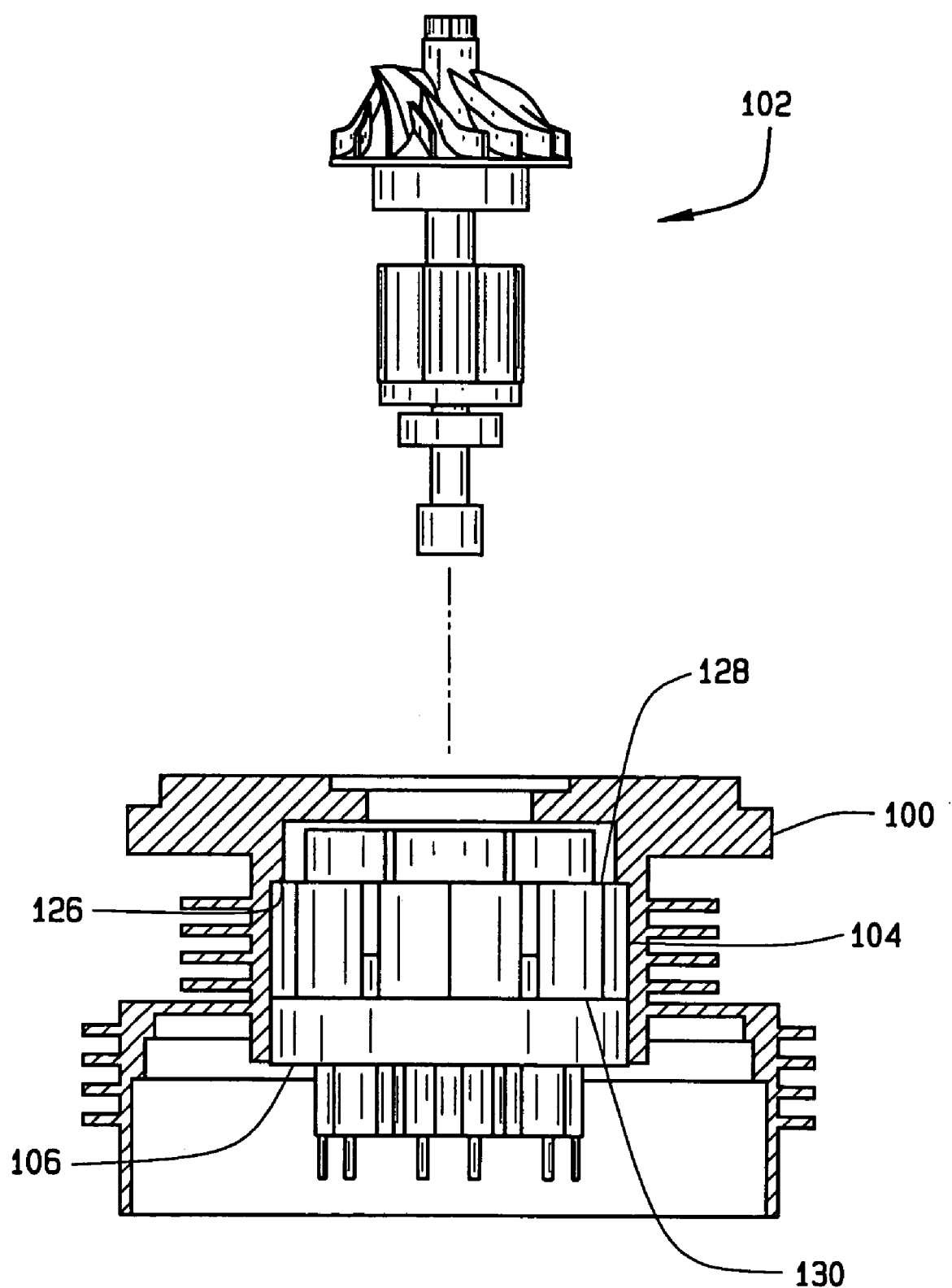
FIG. 11 is a view of the segmented stator captured between the end shield and a stop within the housing (cross-section) shown in FIG. 10.
Figure 12:
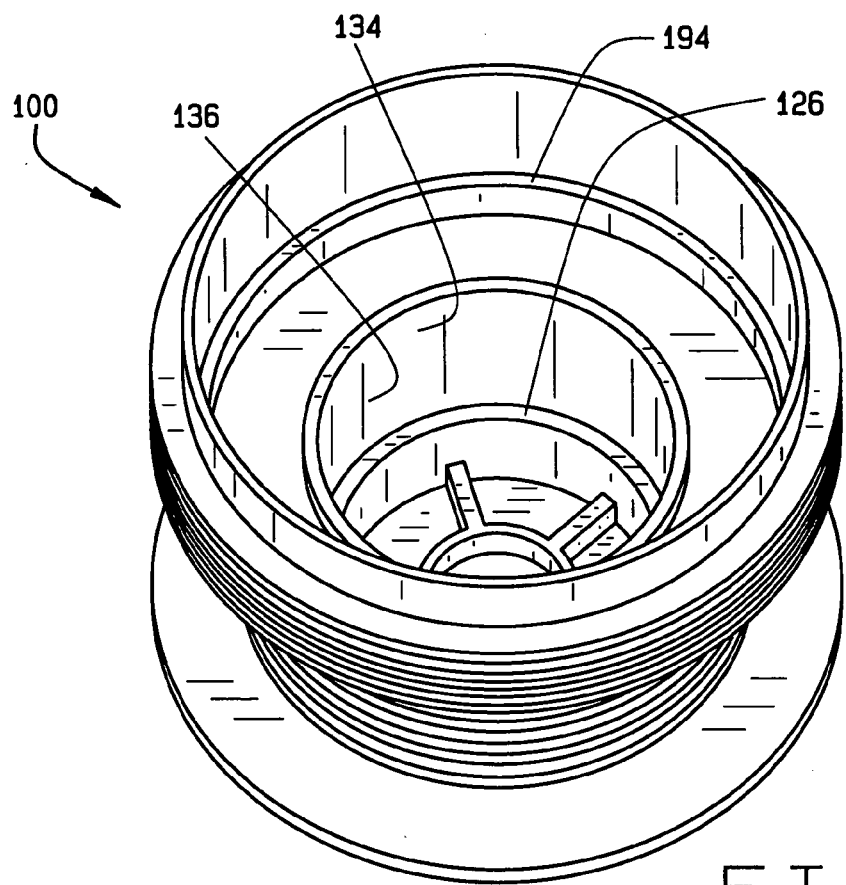
FIG. 12 is an inner perspective view of the housing shown in FIG. 1.
Figure 13:
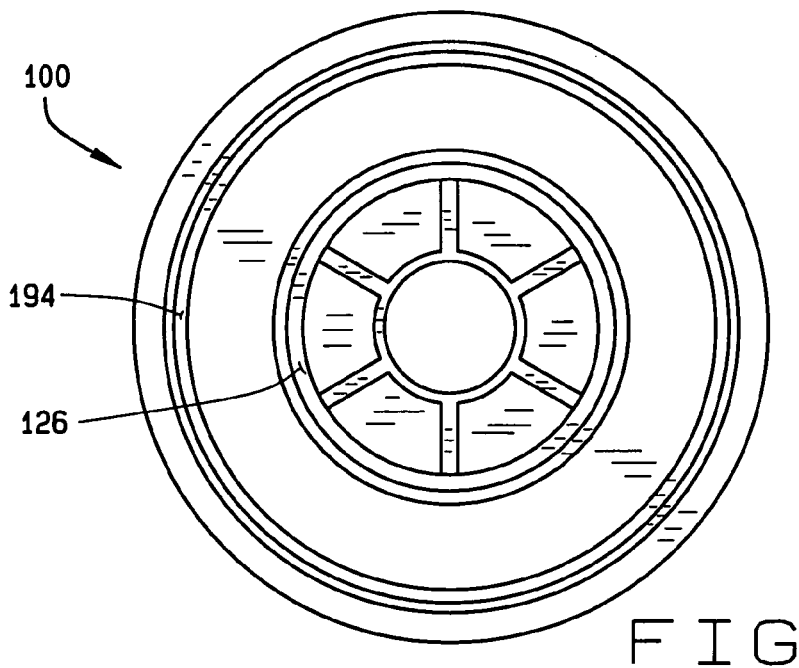
FIG. 13 is an inner view of the housing shown in FIG. 12.
Figure 14:
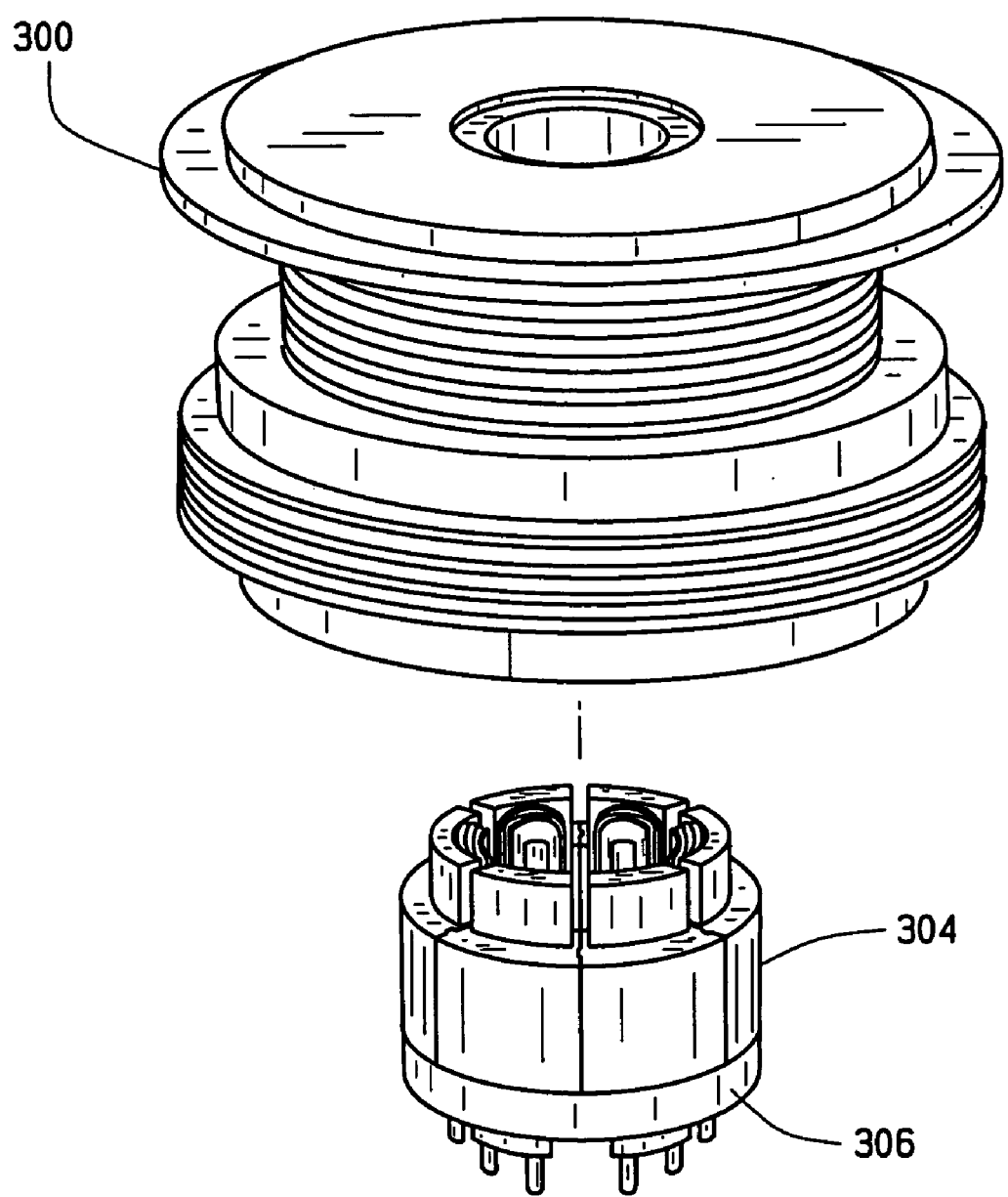
FIG. 14 is an exploded perspective view showing a segmented stator, end shield, and housing according to an exemplary embodiment of the invention.
Figure 15:
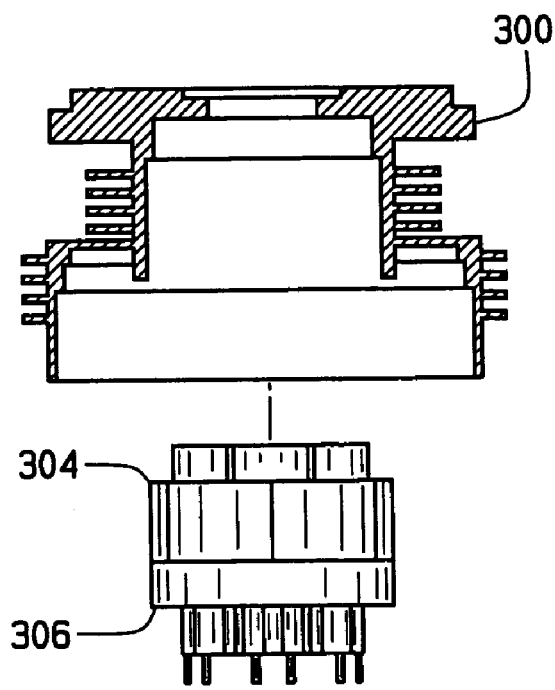
FIG. 15 is an exploded view showing the segmented stator, end shield, and housing (cross-section) shown in FIG. 14.
Figure 16:
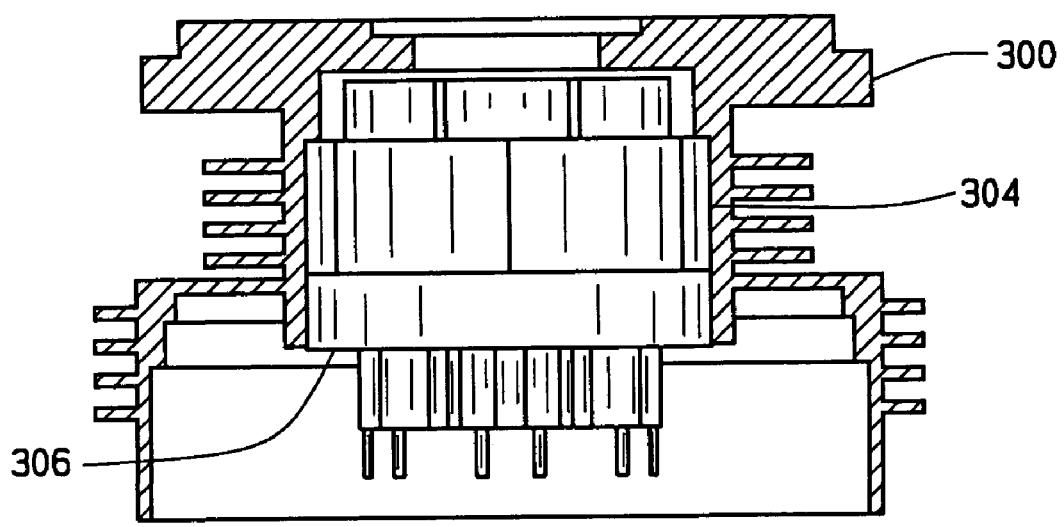
FIG. 16 is a view of the segmented stator captured between the end shield and a stop within the housing (cross-section) shown in FIG. 15.

In FIG. 10, the stator 104 and end shield 106 are aligned for positioning within the housing 100. FIG. 11 illustrates the stator 104 and end shield 106 positioned within the housing 100 such that the end portions 128 and 130 of each stator segment 108 respectively abuts against the internal stop 126 and the end shield 106. In this exemplary manner, the stator 104 can be captured between the end shield 106 and the internal stop 126 independent of mechanical fasteners, such as bolts.

While FIGS. 1 and 10 illustrate the stator 104 being assembled on the end shield 106 (with the pins 112 engaged within the tracks 110) before the stator and end shield are positioned within the housing 100, such is not required. Alternative implementations can include positioning the stator 104 within the housing, and then positioning the end shield 106 within the housing 100 as a separate component in a discrete operation. In which case, the end shield and stator may not include the integral assembly features described above (e.g., the pins 112 and tracks 110), such as in the embodiments shown in FIGS. 14 through 19 including stators 304, 404, end shields 306, 406, and housings 300, 400.

With further reference to FIGS. 10 and 11, the end shield 106 can be coupled to the housing 100 through an interference fit formed between a sidewall 132 of the end shield 106 and a surface 134 of the housing 100. With this interference fit, the end shield 106 can thus be engaged to and retained within the housing 100 independent of mechanical fasteners.

A description will now be provided of an exemplary method for forming the interference fit between the end shield's sidewall 132 and the housing's surface 134. First, the housing 100 can be heated (e.g., induction heated, etc.) to thermally expand the housing 100. The stator 104 and end shield 106 (the stator assembly) can be moved relative to the housing 100 so as to position the stator assembly within the housing 100. That is, the stator assembly can be moved towards the housing 100 as the housing 100 remains stationary, or the housing 100 can be moved towards the stator assembly as the stator assembly remains stationary, or both the stator assembly and the housing 100 can be moved towards each other. In any event, the relative movement between the housing 100 and the stator assembly can continue until the end portions 128 of the stator segments 108 abut against the internal stop 126 within the housing 100. At which point, the stop 126 inhibits continued movement of the stator 104 and end shield 106 into the housing 100. The housing 100 is allowed to cool and thermally contract against the end shield's sidewall 132, thereby forming an interference fit between the housing 100 and the end shield 106. Allowing the housing 100 to cool can include either or both passively allowing the housing 100 to cool and/or actively cooling the housing 100.

Alternatively, other implementations can form the interference fit between the end shield and the housing by thermally contracting the end shield (e.g., by actively cooling the end shield), moving the end shield and/or housing relative to one another so as to position the thermally contracted end shield within the housing, and allowing the end shield to thermally expand against the housing (e.g., by actively heating and/or passively allowing the end shield to return to ambient temperate). In further implementations, the interference fit between the housing and the end shield can be formed by using other suitable methods, such as axial press fitting and thermally conductive adhesives.

A wide range of materials can be used for the housing 100, stator 104, and end shield 106. In preferred implementations, the housing 100 and the end shield 106 are formed from suitable materials so that the housing 100 and end shield 106 have coefficients of thermal expansion for maintaining the interference fit therebetween across the electric machine's operating temperature range. This, in turn, allows the stator's 104 position to be retained between the internal stop 126 and the end shield 106 without being influenced by temperature (or least with reduced influence from temperature).

In one embodiment, the housing 100 and end shield 106 are formed of the same material, such as aluminum, aluminum alloys, among other suitable materials. In which case, the housing 100 and end shield 106 can have about equal coefficients of thermal expansion and thus thermally expand at about the same rate. Alternatively, the housing 100 and end shield 106 can be formed from different materials yet still have coefficients of thermal expansion for maintaining the interference fit across the electric machine's operating temperature range.

Regarding the material(s) used for the stator 104, the same material(s) can be used for the stator 104 as either or both the housing 100 and the end shield 106. In various implementations, however, the stator 104 is formed from a different material that has a lower coefficient of thermal expansion than that used for either the housing 100 and/or end shield 106. For example, one exemplary embodiment includes a steel stator, an aluminum end shield, and an aluminum housing.

In addition to being captured between the end shield 106 and the stop 126 within the housing 100, various implementations can include the stator 104 and the housing 100 being configured so that a circumferential interference fit is formed therebetween, such as between the housing surface 136 and stator sidewall 138 (FIG. 10). This circumferential interference fit can help further secure the stator 104 within the housing 100. In such implementations, this circumferential interference fit may be maintained at all but the highest operating temperatures of the electric machine. But even if the circumferential interference fit is lost, for example, due to a greater rate of thermal expansion of the housing 100 than the stator 104, the stator 104 can remain captured between the stop 126 and end shield 106.

Figure 20:
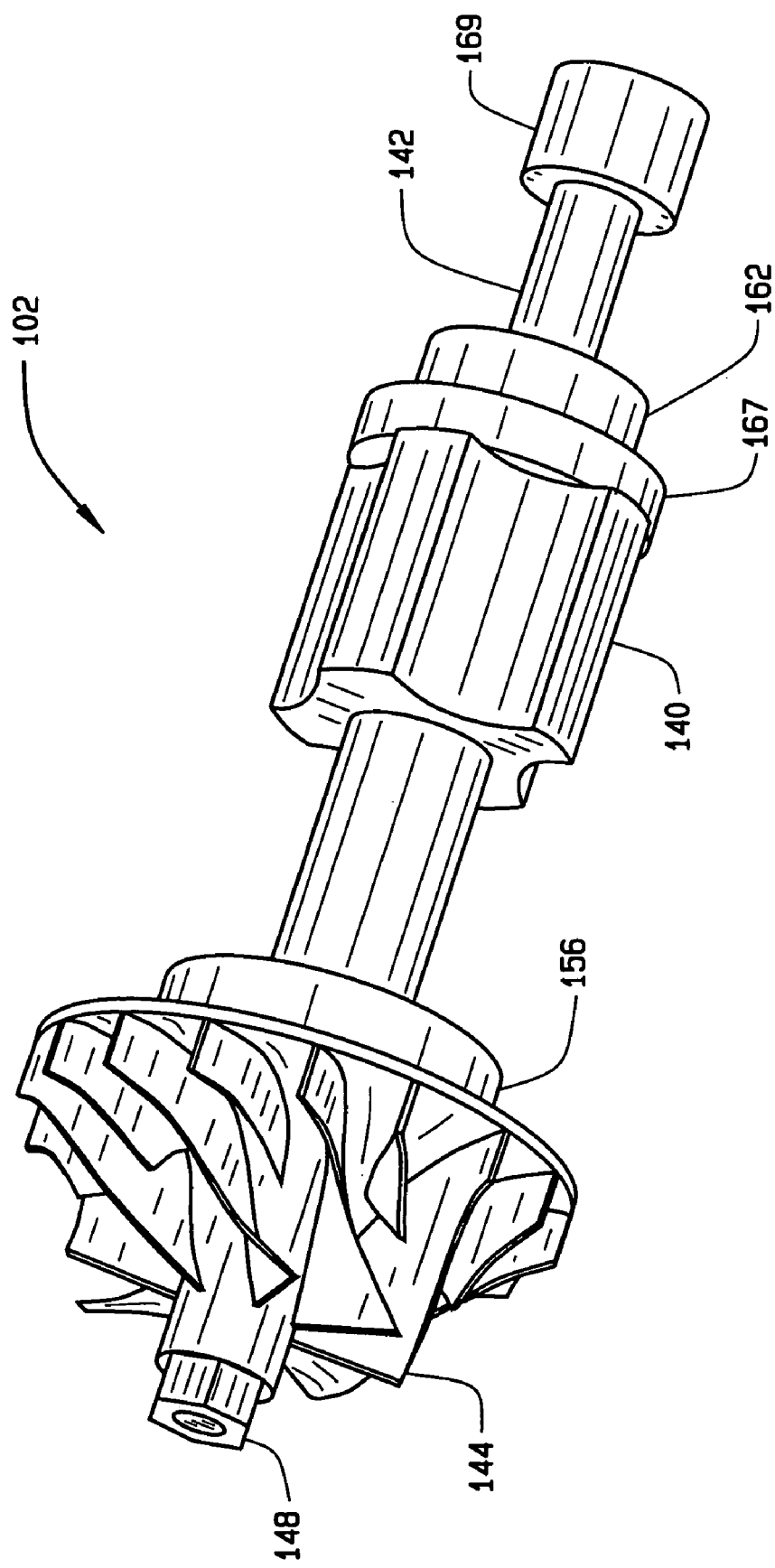
FIG. 20 is a perspective view of the rotor assembly shown in FIG. 1.
Figure 21:
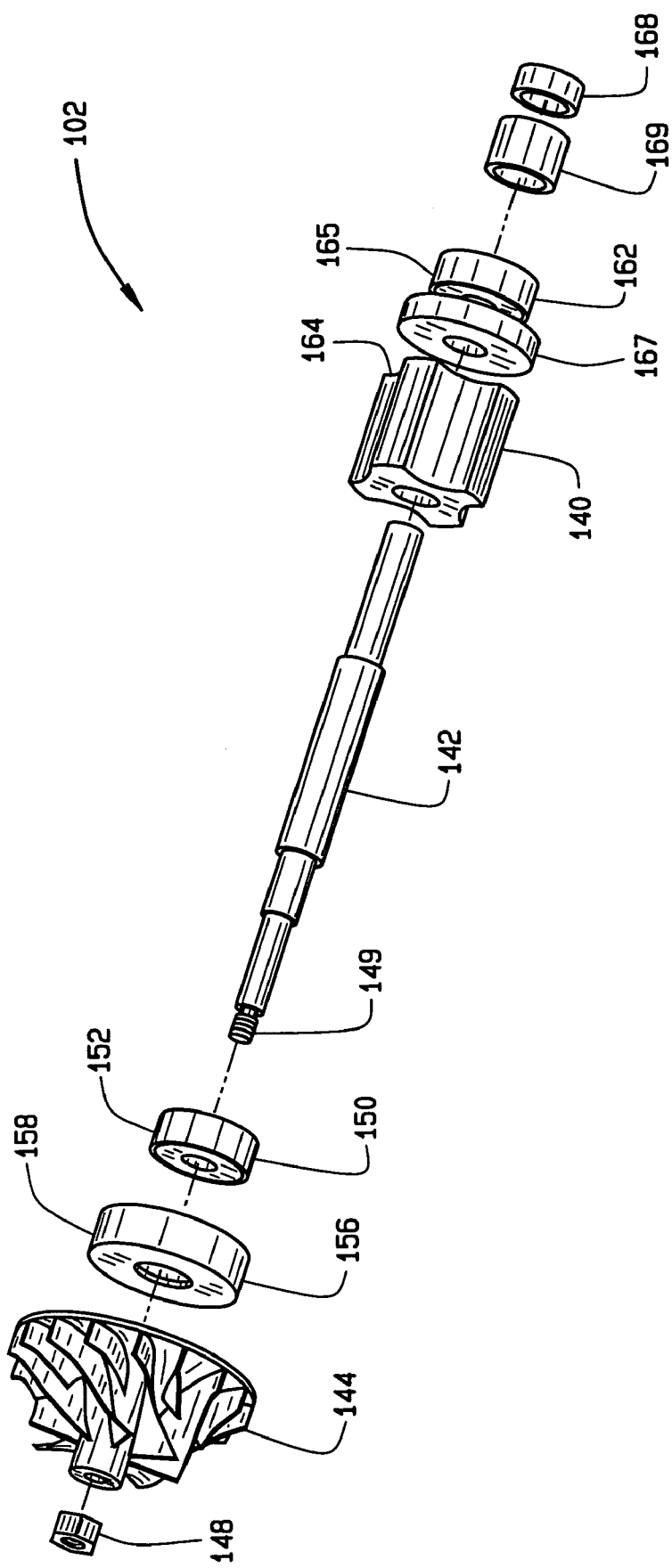
FIG. 21 is an exploded perspective view of the rotor assembly shown in FIG. 20.

As shown in FIGS. 20 and 21, the rotor assembly 102 includes a rotor core 140 coupled to a shaft 142 for common rotation. In one implementation, the rotor core 140 is a ten millimeter inner diameter core, although other sizes are possible depending on the particular application.

An impeller 144 is also coupled to the shaft 142 for common rotation. The impeller 144 can be sized to fit within a recessed portion 146 (FIG. 1) defined by the housing 100. During operation when the shaft 142 and impeller 144 are rotating, the impeller 144 can create a current of air external to the housing 100. This airflow created by the rotating impeller 144 can help cool the housing 100 therein by forced convection. In one implementation, the impeller 144 has an outer diameter between about sixty to seventy millimeters, although other sizes are also possible depending on the particular application.

To maintain the impeller 144 on the shaft 142, an impeller lock nut 148 is threaded onto an end 149 of the shaft 142. Alternatively, other means can be employed for retaining the impeller 144 on the shaft 142.

The rotor assembly 102 also includes a bearing 150 coupled to the shaft 142 generally between the rotor core 140 and the impeller 144. The bearing 150 can include steel rolling elements. In one exemplary embodiment, the bearing 150 is a standard 608-size ball bearing having steel balls. In another embodiment, the bearing 150 is a roller bearing having generally cylindrical steel rollers. In either case, using steel rolling elements can provide significant cost savings as compared to hybrid ceramic angular contact bearings even while still satisfying the high performance requirements demanded by some electric machines, such as an electric supercharger capable of accelerating to seventy thousand revolutions per minute in three-tenths of a second.

In various implementations, the bearing's outer race 152 (FIG. 21) can be sized dimensionally smaller than the opening 154 (FIG. 1) defined by the housing 100. To allow the bearing 150 to be mounted within the opening 154 even though the opening 152 is physically better suited for larger bearings, an adaptor sleeve 156 can be disposed generally around the bearing's outer race 152. Using the adaptor sleeve 156 enables smaller bearings to be supported within a space or opening that is physically better suited for larger bearings. This can be beneficial because smaller bearings typically have higher limiting speeds than larger bearings.

The adaptor sleeve 156 can be sized such that its sidewall 158 (FIG. 102) forms an interference fit with an inner surface 160 of the housing 100 (FIG. 1). This interference fit can secure the adaptor sleeve 156 and the bearing 150 within the opening 154 defined by the housing 100.

A description will now be provided of an exemplary method for forming the interference fit between the adaptor sleeve sidewall 158 and the housing surface 160. First, the housing 100 can be heated (e.g., induction heated, etc.) to thermally expand the housing 100. The adaptor sleeve 156 and/or housing 100 can then be moved relative to one another so as to position the adaptor sleeve 156 within the opening 154 of the thermally expanded housing 100. That is, the adaptor sleeve 156 can be moved towards the housing 100 as the housing 100 remains stationary, or the housing 100 can be moved towards the adaptor sleeve 156 as the adaptor sleeve 156 remains stationary, or both the adaptor sleeve 156 and the housing 100 can be moved towards each other.

In preferred implementations, the rotor assembly 102 can be assembled (FIGS. 22A through 22G) and then balanced before it is installed into the housing 100. In these implementations, positioning the adaptor sleeve 156 within the housing's opening 154 can include relatively moving the entire rotor assembly 102 and the housing 100 towards one another. For example, one implementation includes moving the balanced rotor assembly 102 downward towards the housing 100 to position the sleeve 156 within the opening 154.

An interference fit is then formed when the housing 100 is allowed to cool and thermally contracts against the adaptor sleeve's sidewall 158. Allowing the housing 100 to cool can include passively allowing the housing 100 to cool and/or actively cooling the housing 100.

Alternatively, other implementations can form the interference fit by thermally contracting the adaptor sleeve (e.g., by actively cooling the adaptor sleeve), moving the adaptor sleeve and/or housing relative to one another so as to position the thermally contracted adaptor sleeve within the housing's opening, and then allowing the adaptor sleeve to thermally expand against the housing (e.g., by actively heating and/or passively allowing the adaptor sleeve to return to ambient temperate). In further implementations, the interference fit between the housing and the adaptor sleeve can be formed by using other suitable methods.

A wide range of materials can be used for the adaptor sleeve 156, such as steel, among other suitable materials. The material selection for the sleeve 156 and housing 100 can depend at least in part on thermal coefficients of expansion, thermal conductivity properties and/or on maintaining the interference fit between the housing 100 and sleeve 156.

In various implementations, the interference fit can be maintained across the machine's operating temperature range by appropriately sizing the sleeve 156 and/or by forming the adaptor sleeve 156 and housing 100 from suitable materials such that the housing 100 and adaptor sleeve 156 have coefficients of thermal expansion for maintaining the interference fit across the machine's operating temperature range. This, in turn, allows the adaptor sleeve 156 to remain engaged with the housing 100 independent of mechanical fasteners. In one embodiment, the adaptor sleeve 156 can have a coefficient of thermal expansion that is lower than the housing 100 but the sleeve 156 can be sized such that the interference fit is nevertheless maintained across the electric machine's operating temperature range.

The rotor assembly 102 can also include a second bearing 162 coupled to the shaft 142. In the illustrated embodiment of FIGS. 20 and 21, the second bearing 162 is coupled to the shaft 142 adjacent the side 164 of the rotor core 140 opposite the impeller 144. Separating the first and second bearings 150 and 162 can help to spread out the loads between the two bearings 150 and 162, thereby allowing smaller bearings having higher limiting speeds to be used. Supporting the loads at each end with the spaced-apart bearings 150 and 162 can also yield a stiffer assembly with increased critical speeds as compared to a bearing system with an overhung load (e.g., load supported at only one end). But if the bearings are spaced too widely apart, the stiffness of the assembly can instead be decreased. Therefore, the preferred distance separating the bearings 150 and 162 can vary and will depend on the particular application. In various implementations, the centers of the bearing 150 and 162 are separated from one another by a distance of about two inches, although other distances can also be employed. By spacing out the bearings 150 and 162, various implementations enable bearings having steel rolling elements to be used in electric machines operable at high speeds and elevated temperatures.

Figure 24:
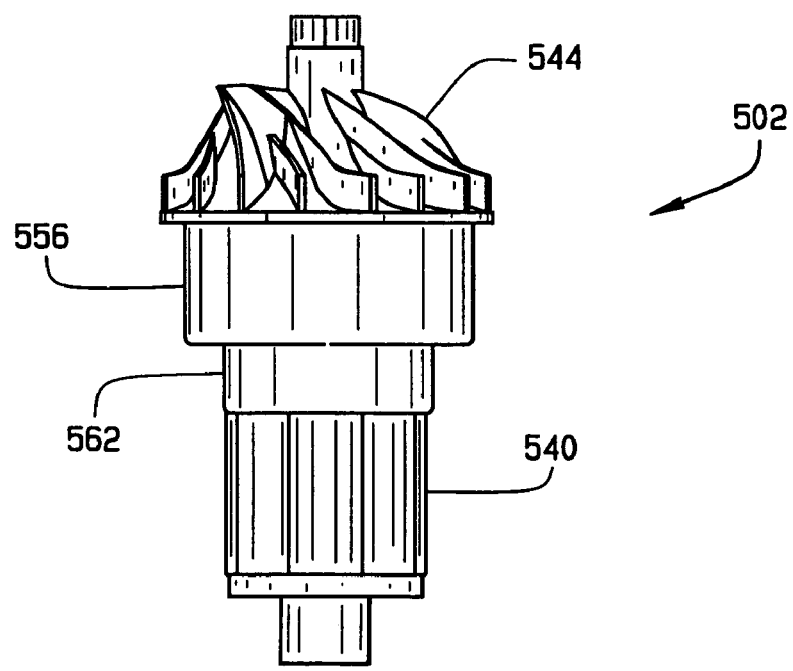
FIG. 24 is an elevation view of a rotor assembly according to an exemplary embodiment of the invention.
Figure 29:
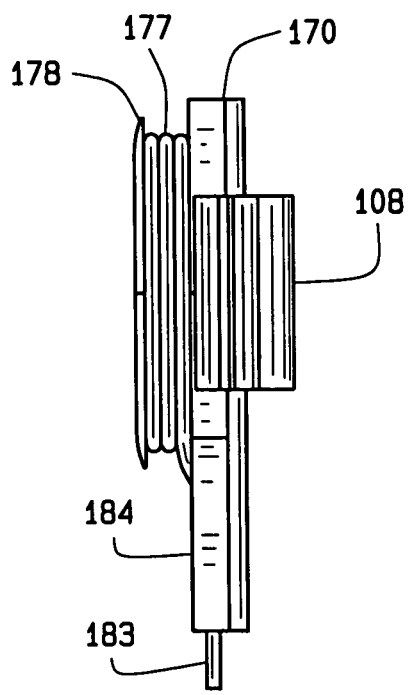
FIG. 29 is a side elevation view of the end cap, stator segment, and stator winding shown in FIG. 28.
Figure 30:
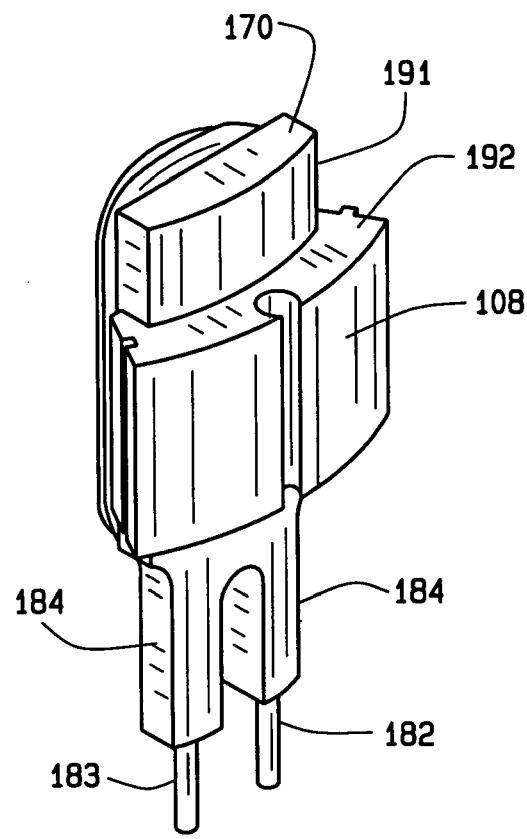
FIG. 30 is a perspective view of the end cap, stator segment, and stator winding shown in FIG. 28.

Alternative implementations can include a second bearing positioned adjacent the first bearing. For example, FIG. 24 illustrates a rotor assembly 502 in which a first bearing (not shown but positioned within a sleeve 556) and a second bearing 562 adjacent one another on a shaft generally between a rotor core 540 and an impeller 544. Still yet other implementations may not even include a second bearing.

With further reference to FIGS. 20 through 22, the second bearing 162 can include steel rolling elements. In one exemplary embodiment, the second bearing 162 is a standard 608-size ball bearing having steel balls. In another embodiment, however, the second bearing 162 is a roller bearing having generally cylindrical steel rollers. The second bearing 162 can be identical to the first bearing 150, although this is not required.

The second bearing 162 can be sized such that its outer race 165 fits within a central opening 166 (FIG. 5) defined by the end shield 106. When positioned within the end shield's opening 166, the second bearing 162 can contact a spring (e.g., multiwave compression spring, conventional round wire spring, etc.) also positioned within the end shield's opening 166. In this exemplary manner, the second bearing 162 can help maintain concentricity, support and balance the rotor assembly 102.

The use of a multiwave compression spring is generally preferred over a conventional round wire spring because multiwave springs generally occupy far less compressed height space than traditional round wire springs, while also providing more deflection with the same load specifications.

A balancing disk 167 can be positioned generally between the rotor core 140 and the second bearing 162. The balancing disk 167 provides a mass from which material can be removed for dynamic two-plane balancing of the rotor assembly 102.

Angular position of the rotor core 140 can be determined by sensing variation in the magnetic field of the sensor magnet 168, which is coupled to the shaft 142. These magnetic field changes, such as shifts in the polarity, can be quantified by an external sensor (not shown) located at a fixed position within the electric machine but external to the rotor assembly 102. In further implementations, the angular position of the rotor core 140 can be determined using other suitable means, such as optic sensors and/or sensorless electronic controls.

The sensor magnet 168 can be supported on the shaft 142 by a sensor magnet cup 169. In turn, the sensor magnet cup 169 can be retained on the shaft 142 by way of an interference or friction fit with the shaft 142. Alternatively, other means can be used to retain the sensor magnet cup 169 on the shaft 142, such as adhesives, mechanical fasteners, threads, etc.

A description will now be provided of an exemplary method by which the rotor assembly 102 can be constructed. FIGS. 22A through 22G illustrate various stages of the rotor assembly's construction, which can be performed manually, via automation, or a combination thereof.

Figure 22A:
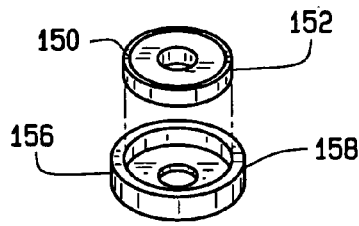
FIGS. 22A through 22G illustrate various stages as the rotor assembly shown in FIG. 20 being assembled according to an exemplary implementation of the invention.
Figure 22B:
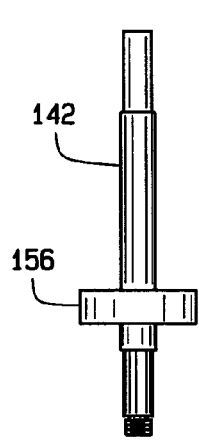
Figure 22C:
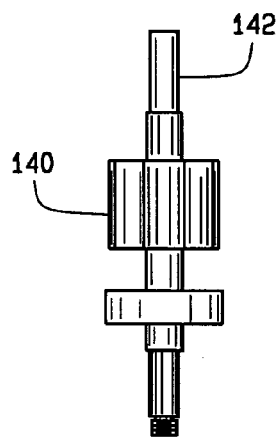
Figure 22D:
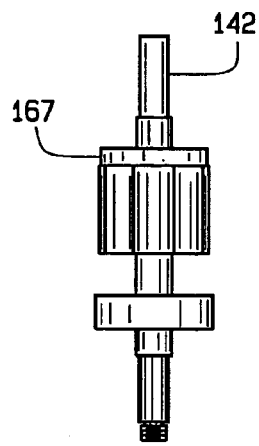
Figure 22E:
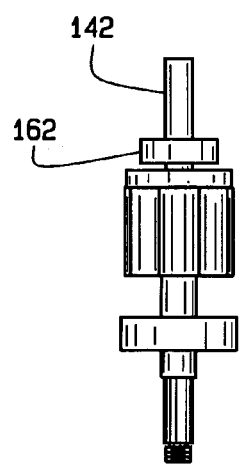
Figure 22F:
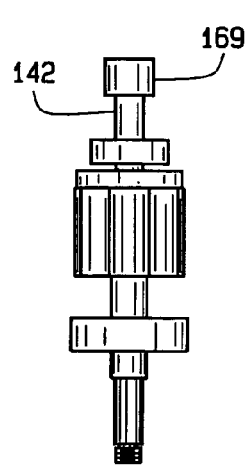
Figure 22G:
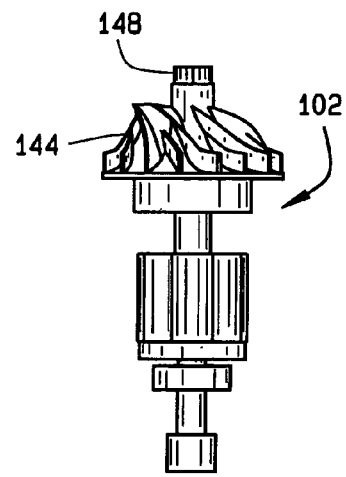
Figure 23:
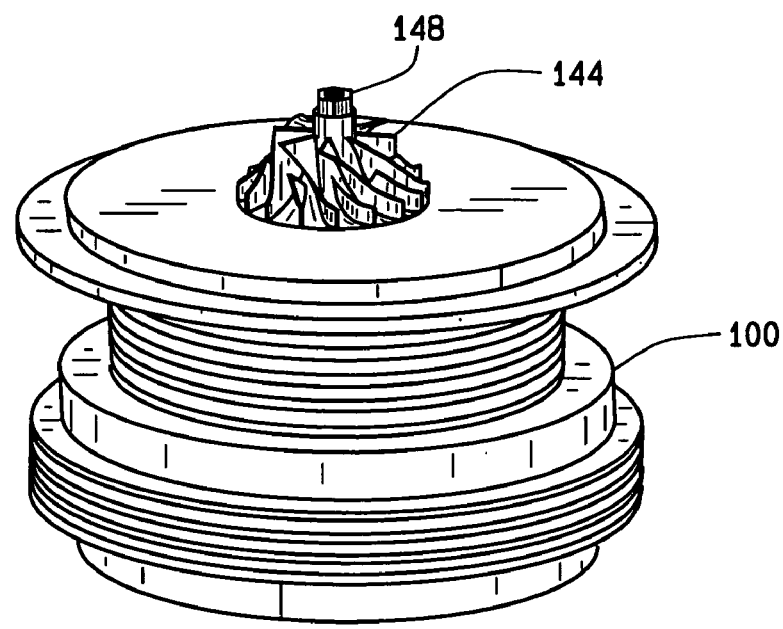
FIG. 23 is a perspective view of the housing and the impeller of the rotor assembly shown in FIG. 1 after the rotor assembly has been engaged with the housing.

As shown in FIG. 22A, the adaptor sleeve 156 is positioned generally around the outer race 152 of the bearing 150, for example, by press fitting the bearing 150 into the adaptor sleeve 156. The shaft 142 is then slidably received (e.g., pressed) through the central openings (FIG. 22A) of the bearing 150 and sleeve 156 (FIG. 22B). Next, the rotor core 140 is slidably received on (e.g., pressed onto) the shaft 142 (FIG. 22C). The balancing disk 167 is slidably received on (e.g., pressed onto) the shaft 142 against the rotor core 140 (FIG. 22D). The second bearing 162 is slidably received on (e.g., pressed onto) the shaft 142 (FIG. 22E). The sensor magnet cup 169 is slidably received on (e.g., pressed onto) the shaft 142 (FIG. 22F). The sensor magnet 168 (not shown in FIG. 22F, but shown in FIG. 21) is aligned to the rotor core's magnetic poles and positioned within the sensor magnet cup 169. The subassembly is inverted, and the impeller 144 and lock nut 148 are added (FIG. 22G).

The rotor assembly 102 is now ready to be balanced. Balancing the rotor assembly 102 can include material removal from the balancing disk 167, material removal from the underside of the impeller 144, combinations thereof, etc. Balancing the entire rotor assembly before its installation to the housing allows for a very well-balanced rotor assembly. This, in turn, can help minimize (or at least reduce) dynamic loading on the rotor assembly.

The location and axial control of the start and finish turns of the wound segments are left largely to chance particularly when using heavy gauge wire. Therefore, secondary manipulation of the lead and exit ends of the stator windings is normally required in order to connect the stator windings to electronics, such as the power and control electronics for controlling the machine's operation. For example, many applications use secondary components, intermediate connectors, leads, and/or lead frames to connect the stator windings to the electronics. But these secondary components can add manufacturing processes and costs, can increase electrical resistance, and can hinder the implementation of a fully automated assembly process.

In various implementations of the present invention, however, end caps are used to guide and retain the position of the stator winding's lead and exit ends. This, in turn, enables the stator windings to be connected directly to electronics (e.g., power and control electronics) without the need for secondary connections and lead frames. By properly positioning and retaining the position of the stator winding lead and exit end, the end cap can also facilitate automated assembly and the integration of power and control electronics into the primary machine housing as described below.

FIGS. 25 through 36 illustrate an exemplary end cap 170 that can be coupled to a stator segment 108. The end cap 170 includes first and second pieces 171 and 172 slidably positioned generally around an engagement member 173 of the stator segment 108. Alternatively, other implementations can include a monolithic or single-piece end cap.

As shown in FIG. 26, the end cap pieces 171, 172 define ribs or ridges 174. Each rib 174 is configured to be slidably received within a corresponding groove 175 defined by the stator engagement member 173. The engagement of the ribs 174 with the grooves 175 removably secures the end cap pieces 171, 172 to the stator segment 108. Alternative embodiments, however, include end caps that do not have ribs or that include more or less ribs than that shown in the figures. In addition, the sizes of the engagement member 173, grooves 175, and ribs 174 relative to one another can vary depending on the particular application.

When engaged to the stator segment 108, the end cap pieces 171, 172 cooperate to define a generally curved surface 176 (FIG. 25) around which wire can be wound to form a stator winding 177 (FIG. 28). In one implementation, the stator winding 177 is formed by winding six turns of two-millimeter wire onto the generally curved surface 176. Alternative implementations, however, can include stator windings formed from more or less than six-turn windings and/or from wire that is larger or smaller than two-millimeter wire.

The end cap 170 can also include a flange 178 disposed entirely around the generally curved surface 176. This flange 178 can help retain the wire or windings 177 on the generally curved surface 176, thereby preventing (or at least reducing the possibility of) the wire from entering the stator bore. While the figures show a single continuous flange 178 disposed entirely around the generally curved surface 176, other implementations can include a single wire retaining flange disposed only partially around the generally curved surface. Yet other implementations can include a plurality of wire retaining flanges extending entirely and/or partly around the generally curved surface.

The end cap 170 also includes grooves or slots 180, 181. These grooves 180, 181 are sized to engagingly receive the lead and exit ends 182, 183 of the stator winding 177.

In the illustrated embodiment, the end cap 170 includes a pair of legs or extensions 184 each defining a different one of the grooves 180, 181. These legs 184, and thus the grooves 180, 181 defined thereby, extend axially away from the stator segment 108. Alternatively, other implementations can includes an end cap having a single leg that defines both grooves.

Figure 39:
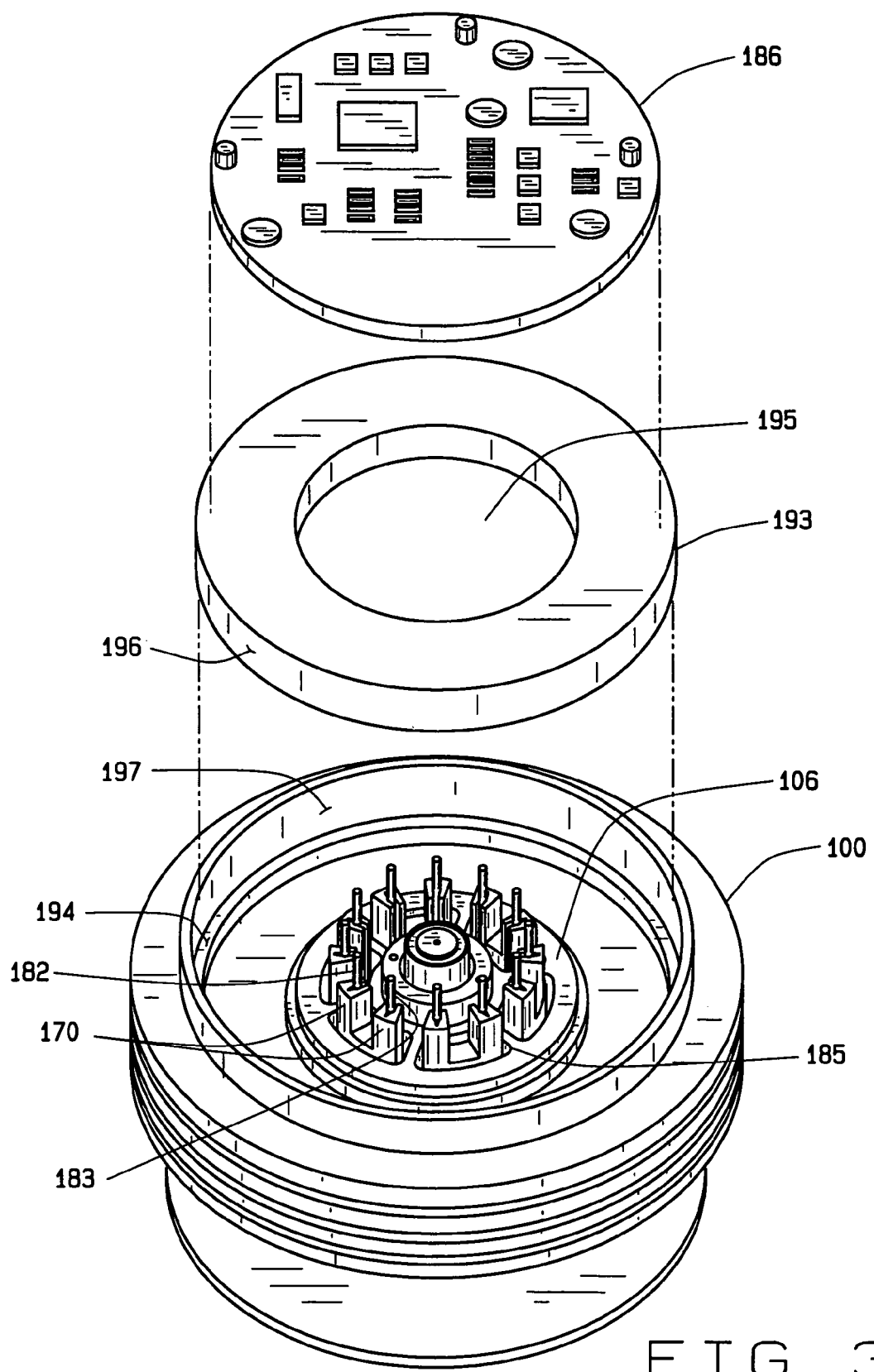
FIG. 39 is an exploded perspective view showing an electronics mount and electronics aligned for positioning within a housing according to an exemplary embodiment of the invention.
Figure 40:
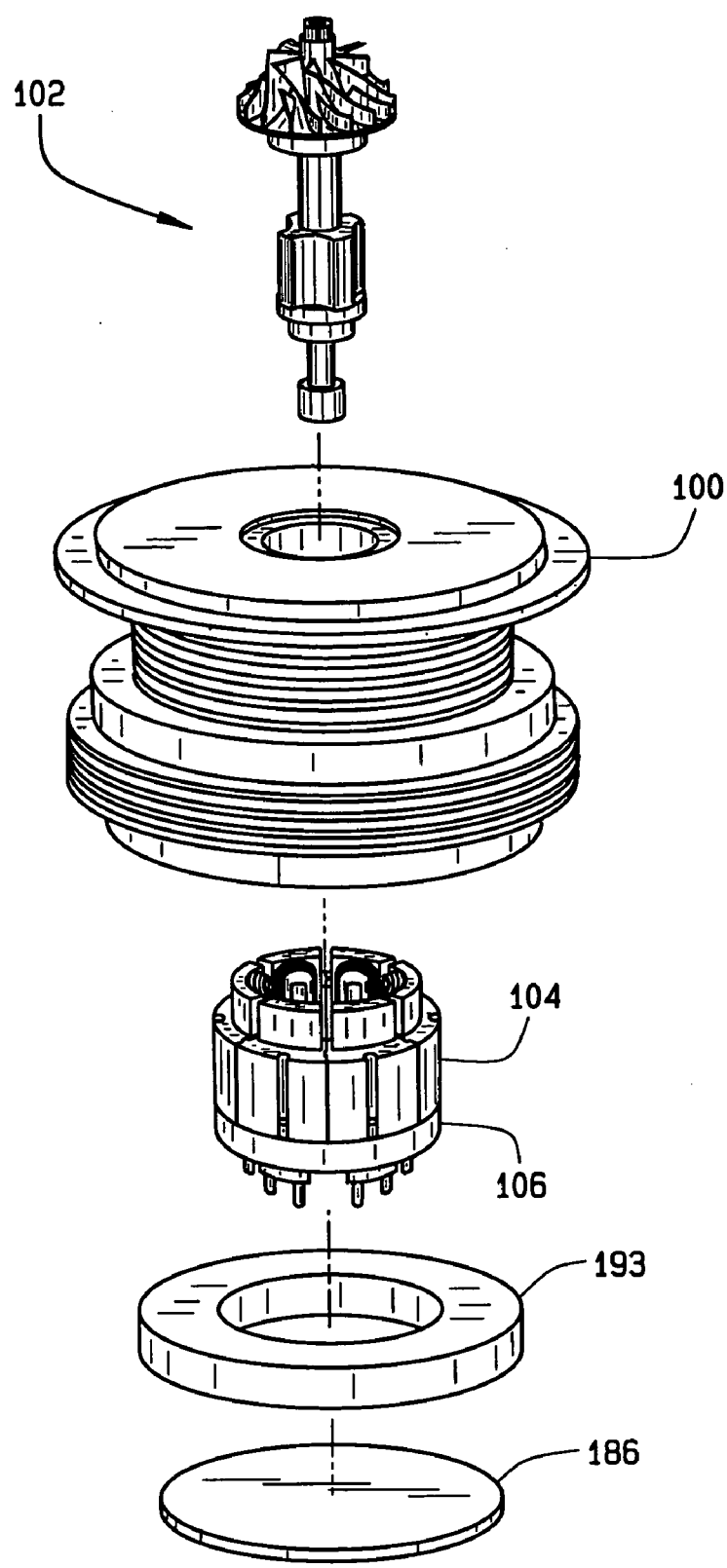
FIG. 40 is a perspective view of a rotor assembly, housing, segmented stator, end shield, electronics mount, and electronics according to an exemplary embodiment of the invention.

When the lead and exit ends 182, 183 are engaged within the respective grooves 180, 181 (FIGS. 28, 31, and 32), the end cap 170 can guide the lead and exit ends 182, 183 through an opening 185 in the end shield 106 as shown in FIG. 39. The end cap 170 can thus position and maintain the position of the lead and exit ends 182, 183, for example, for connection to a power and control electronics assembly 186 or other interconnections as required.

Further, the legs 184 and grooves 180, 181 defined thereby can have a sufficient length to extend through the circumferentially arranged windows 185 in the end shield 106, thereby positioning the lead and exit ends 182, 183 closer to whatever electronics (e.g., power and control electronics of assembly 186 in FIG. 39) that may ultimately be connected to the lead and exit ends 182, 183.

In various implementations, the grooves 180, 181 are configured to form a snap-fit with the stator winding's lead and exit ends 182, 183 respectively. In the illustrated embodiment of FIG. 36, each groove 180, 181 includes a cross-section having a first generally u-shaped portion 187 and a narrower second generally unshaped portion 188. This exemplary configuration for the grooves 180, 181 allows the lead and exit ends 182, 183 to be "snapped" into the corresponding groove 180, 181.

Figure 31:
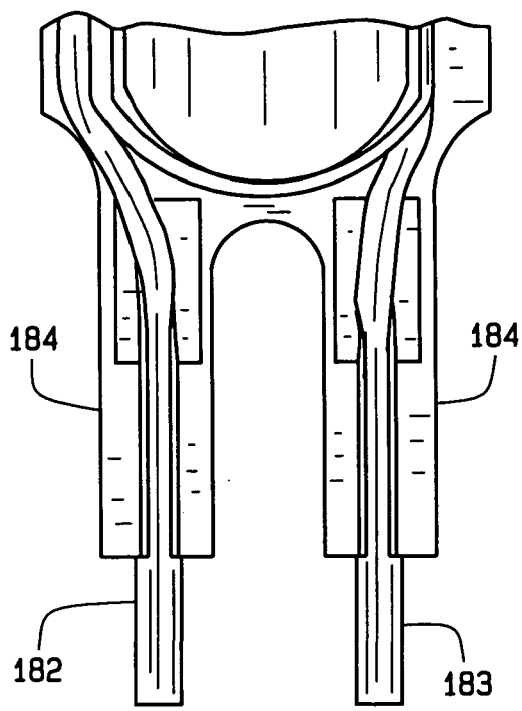
FIG. 31 is an elevation view showing the engagement of the stator winding's lead and exit ends within the grooves and reliefs of the end cap shown in FIG. 28.
Figure 32:
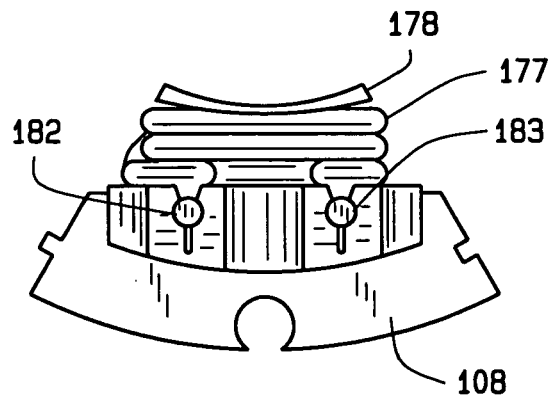
FIG. 32 is a bottom plan view showing the engagement of the stator winding's lead and exit ends within the grooves of the end cap shown in FIG. 31.
Figure 33:
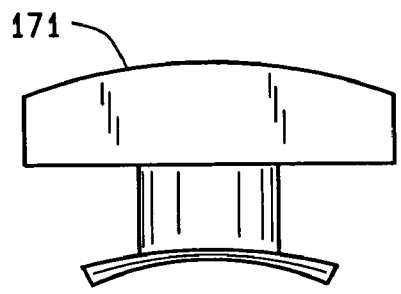
FIG. 33 is a top plan view of the upper end cap piece shown in FIG. 26.
Figure 34:
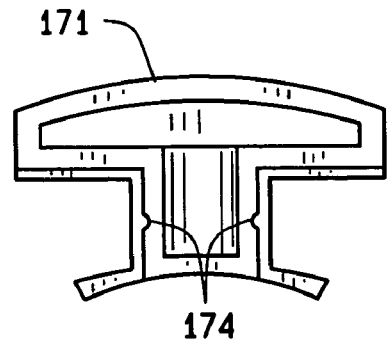
FIG. 34 is a bottom plan view of the upper end cap piece shown in FIG. 26.
Figure 35:
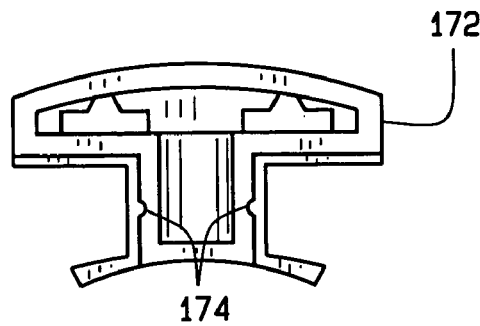
FIG. 35 is a top plan view of the lower end cap piece shown in FIG. 26.
Figure 36:
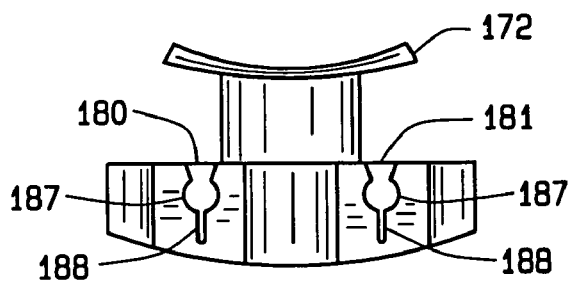
FIG. 36 is a bottom plan view of the lower end cap piece shown in FIG. 26.

As shown in FIGS. 25 and 31, the end cap 170 can also define a relief 189 adjacent each groove 180, 181. Each relief 189 can be configured to provide enough space to accommodate a bend in the lead and exit ends 182, 183. When engaging the lead and exit ends 182, 183 with their corresponding grooves 180, 181, bent portions 190 of the lead and exit ends 182, 183 can be positioned within the corresponding relief 189, thereby allowing the wire to lay flat in the grooves 180, 181. By way of example, the bent portions 190 can be pressed into the wire even before it is wound onto the generally curved surface 176 of the end cap 170.

The end cap 170 can be sized such a portion 191 (FIG. 30) thereof extends upwardly beyond an end 192 of the stator segment 108. This feature can be beneficial in those instances in which the stator segment 108, or fully assembled stator 104 (FIG. 1) is laid topside down on a horizontal support surface (e.g., table, work bench, etc.). In which case, the end cap portion 191 can help protect the stator winding 177 from possible damage that might otherwise be caused by physical contact between the stator winding 177 and the support surface.

A wide range of materials can be used for the end cap 170, preferably. In preferred implementations, the end cap 170 is formed from one or more electrically insulative materials such as plastic. In which case, the end cap 170 can electrically insulate the stator winding 177 from the stator segment 108, end shield 106, and housing 100.

Figure 5:
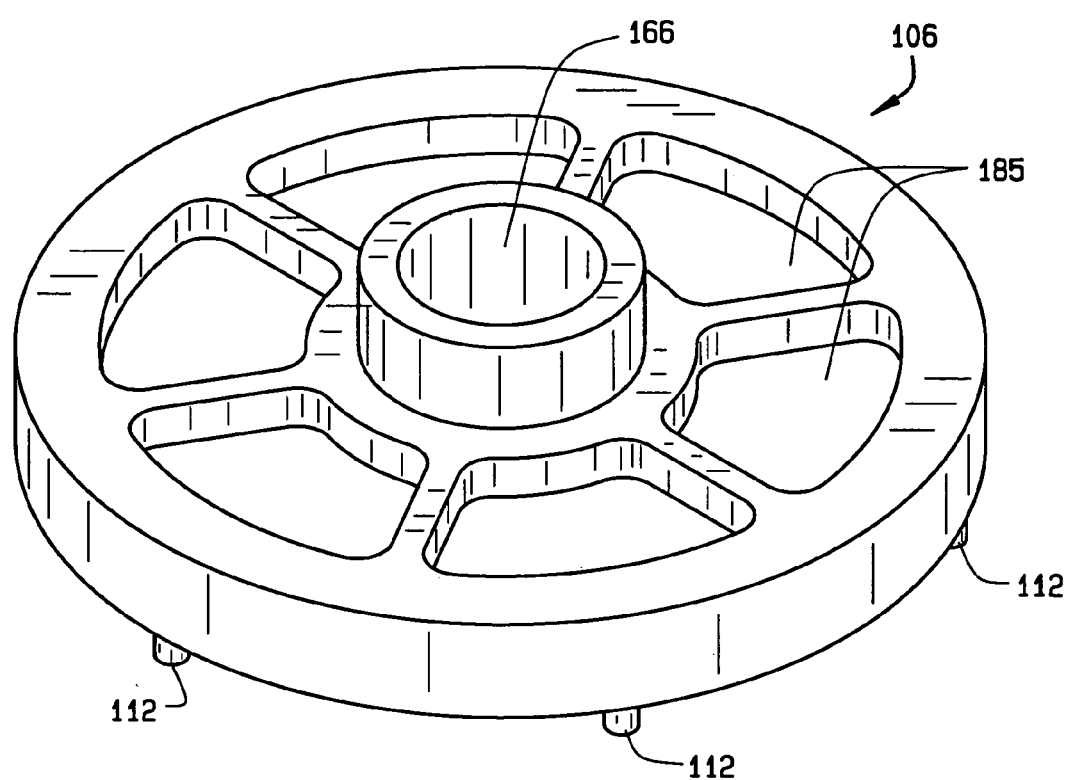
FIG. 5 is a perspective view of the end shield shown in FIG. 1.
Figure 6:
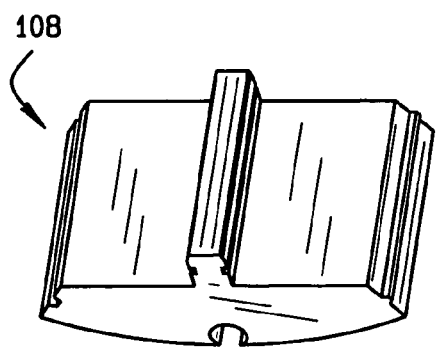
FIG. 6 is a perspective view of an unwound stator segment shown in FIG. 3.
Figure 17:
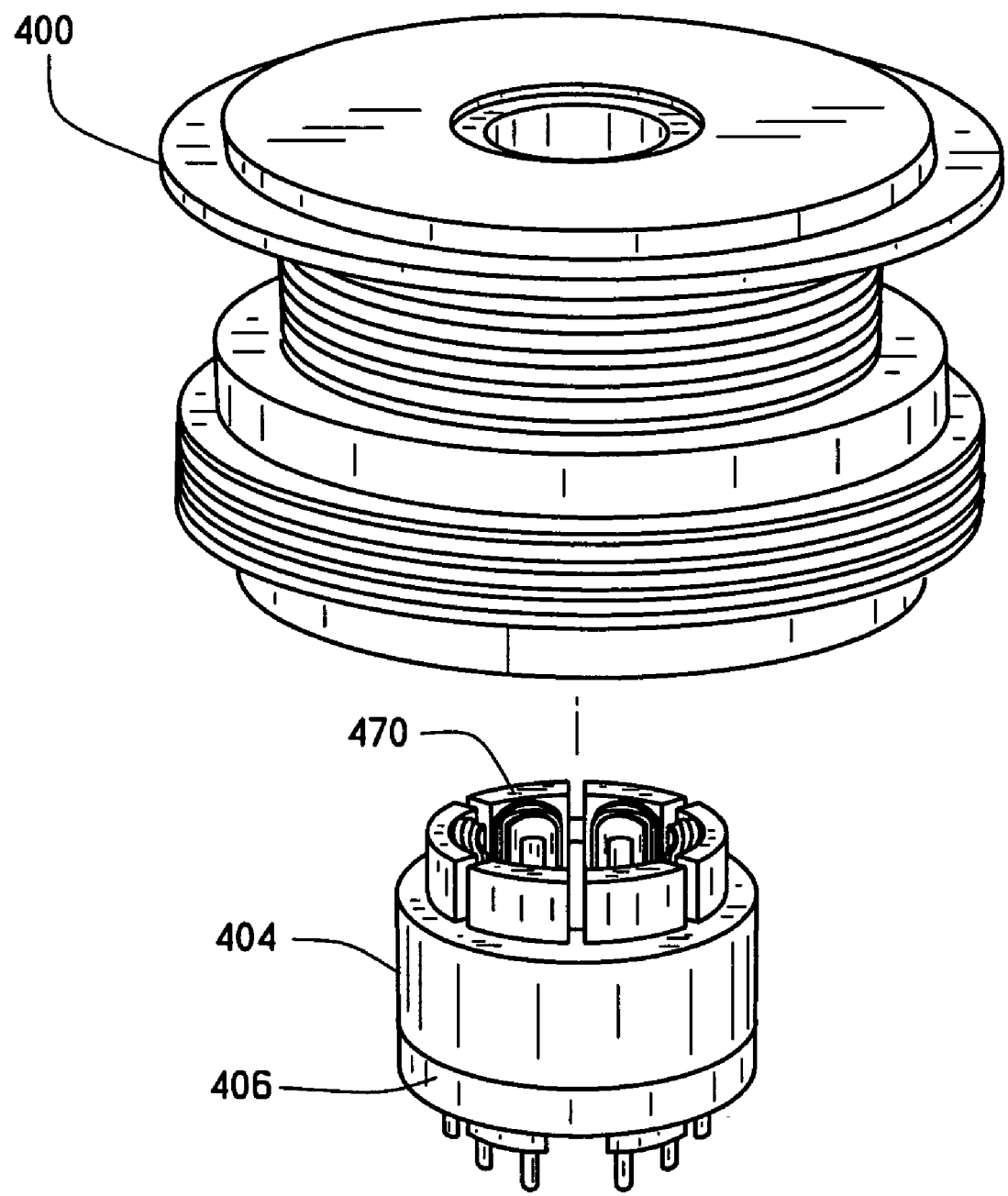
FIG. 17 is an exploded perspective view showing a non-segmented stator, end shield, and housing according to an exemplary embodiment of the invention.
Figure 18:
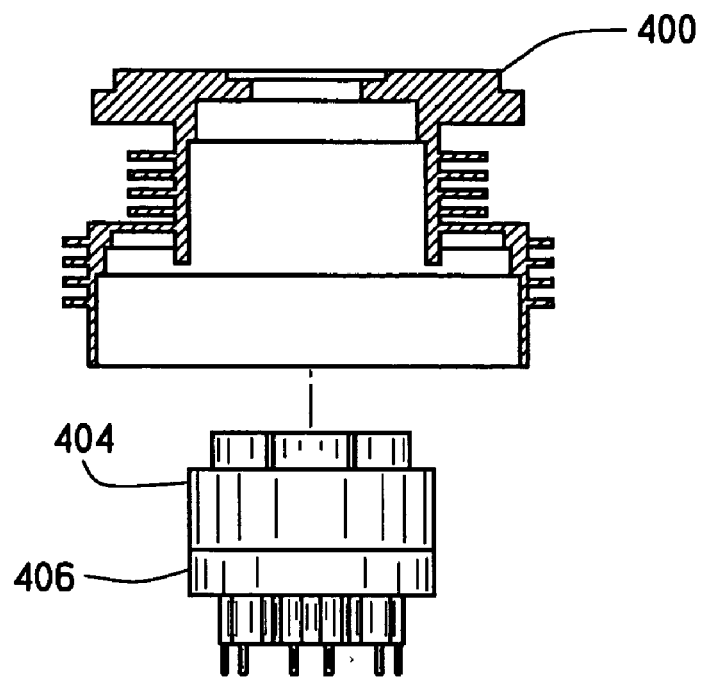
FIG. 18 is an exploded view showing the non-segmented stator, end shield, and housing (cross-section) shown in FIG. 17.
Figure 19:
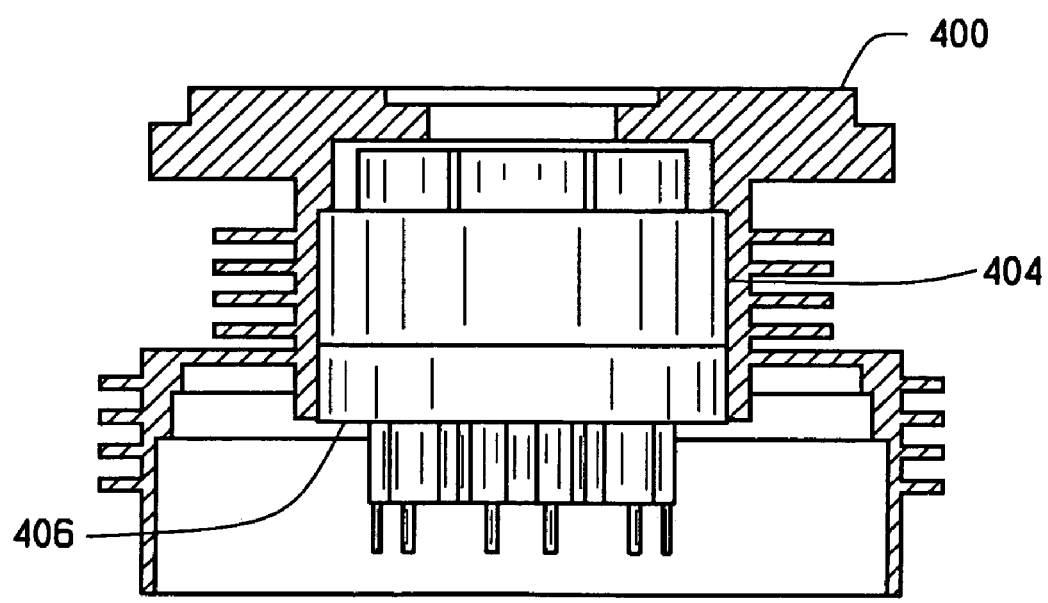
FIG. 19 is a view of the non-segmented stator captured between the end shield and a stop within the housing (cross-section) shown in FIG. 18.
Figure 37:
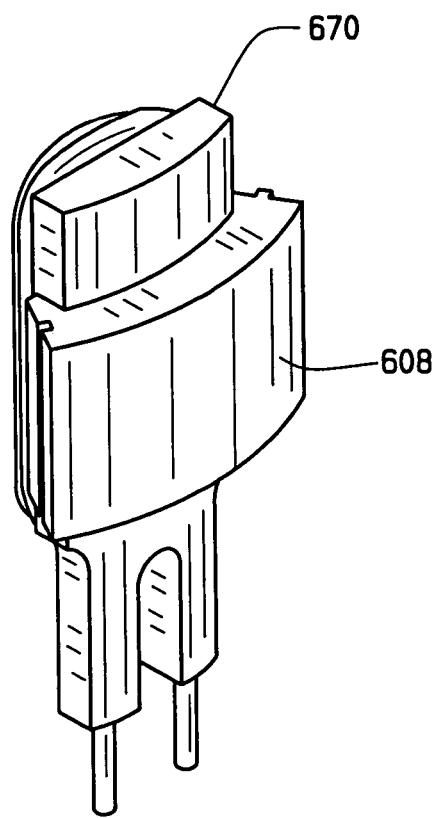
FIG. 37 is a perspective view of an end cap coupled to a stator segment according to an exemplary embodiment of the invention.
Figure 38:
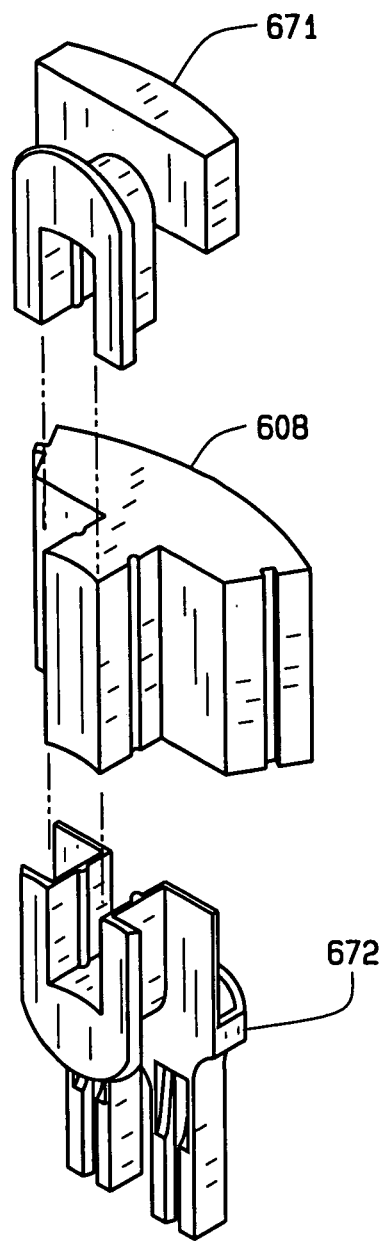
FIG. 38 is an exploded perspective view of the end cap showing the two pieces aligned for engagement with the stator segment shown in FIG. 37.

FIGS. 1, 5, and 39 illustrate an exemplary implementation including six end caps 170, six stator segments 108, and the end shield 106 defining six circumferentially arranged windows 185 (FIG. 5). Alternative implementations, however, can include more or less end caps and stator segments and/or end shields defining more or less than six openings depending on the particular application. Indeed, some implementations include using one or more end caps with a non-segmented or full round stator. For example, FIG. 17 illustrates six end caps 470 coupled to a non-segmented stator 404 positioned on an end shield 406. FIGS. 37 and 38 illustrate another embodiment in which an end cap 670 (including pieces 671 and 672) is being used in conjunction with a stator segment 608 that does not include the integral assembly features described above (e.g., the pins and tracks).

FIG. 39 shows each end cap 170 guiding its corresponding pair of lead and exit ends 182, 183 through a different window 185 in the end shield 106. By properly positioning and retaining the position of the stator winding lead and exit ends 182, 183, the end caps 170 can facilitate the integration of the power and control electronics assembly 186 and mount 193 into the housing 100.

FIGS. 39 through 43 illustrate another embodiment of the invention in which the housing 100 is sized to receive the mount 193 and electronics assembly 186. The housing 100 is also sized to receive the stator 104 and the end shield 106. Accordingly, the stator 104 and end shield 106 can be positioned within the same housing 100 as the mount 193 and electronics assembly 186.

Figure 41:
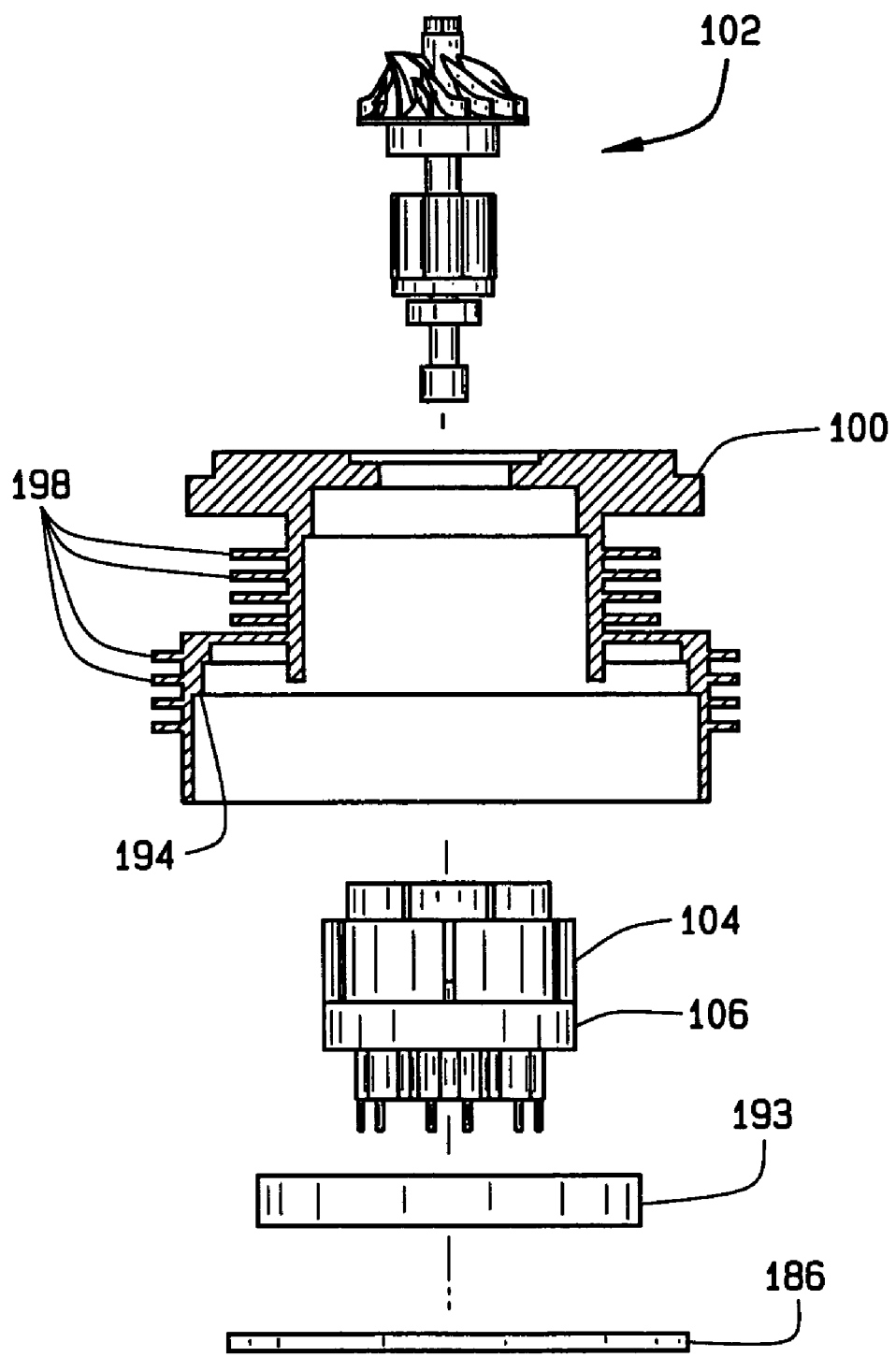
FIG. 41 is a view showing a rotor assembly, housing (cross-section), segmented stator, end shield, electronics mount, and electronics shown in FIG. 40.
Figure 42:
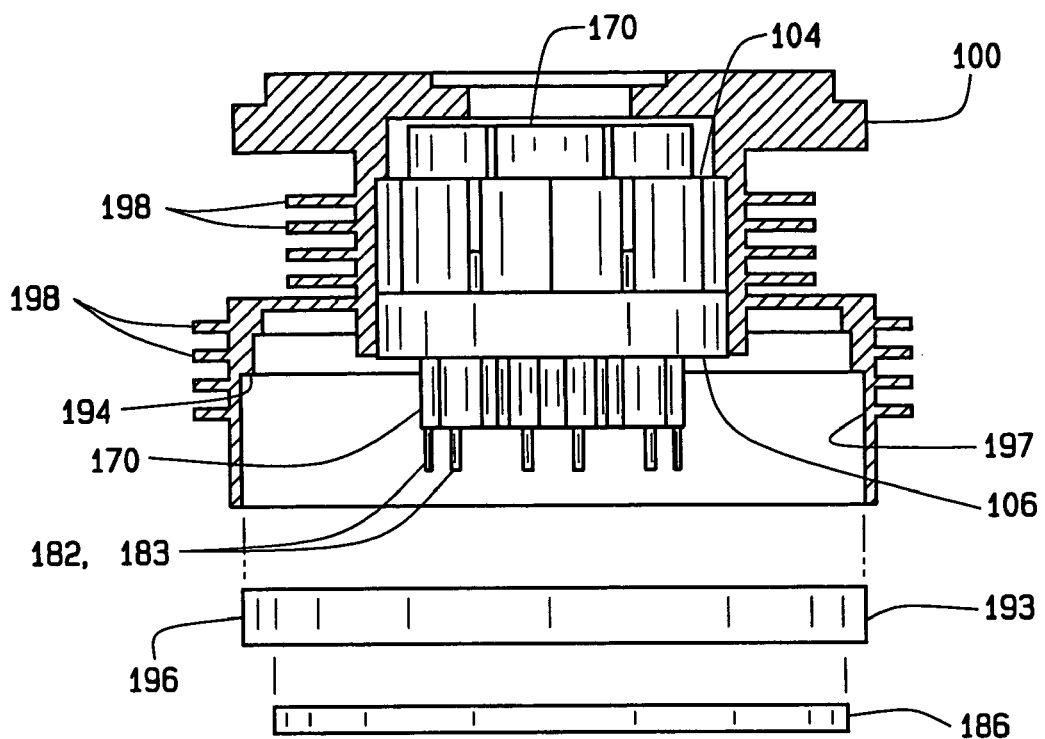
FIG. 42 is a view showing the segmented stator captured between the end shield and a stop within the housing (cross-section) shown in FIG. 41.
Figure 43:
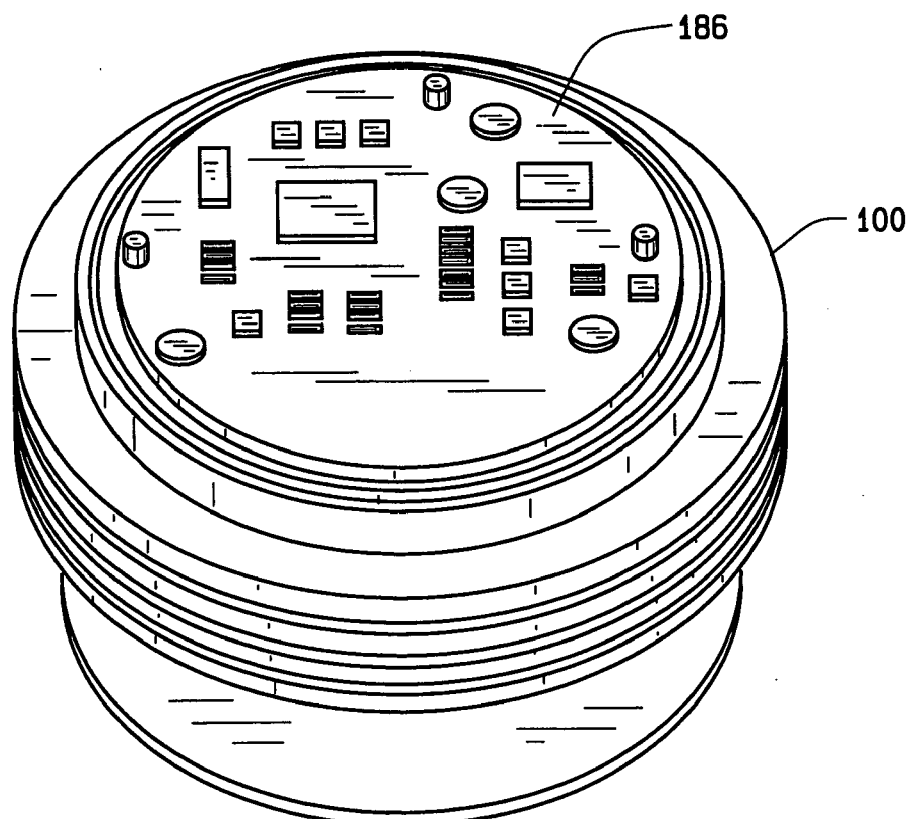
FIG. 43 is a perspective view showing the electronics mount and electronics within the housing shown in FIG. 39.

In various implementations, the housing 100 can also include mounting and locating features for the mount 193. For example, and as shown in FIGS. 39, 41 and 42, the housing 100 can define an internal stop or shoulder 194 configured to contact the mount 193. While assembling the electric machine, the mount 193 and/or the housing 100 can be moved relatively towards one another until the mount 193 abuts against the stop 194 within the housing 100. At which point, the stop 194 inhibits continued relative movement of the mount 193 into the housing 100.

As shown in FIG. 39, the mount 193 is configured in the shape of a generally circular ring that defines a central circular opening 195 therethrough. Alternatively, other shapes can be employed for the mount depending on the particular configuration of the housing in which the mount will be positioned. For example, other embodiments can include a mount having a non-circular shape (e.g., rectangular, triangular, ovular, among others) and/or a solid or non-annular mount that does not define any openings therethough.

The mount 193 can also define one or more recesses or through-holes into which one or more electronic components (e.g., capacitors, etc.) extend. By having electronics components extend into the recesses or through-holes defined by the mount 193, the thickness of those electronics components can be accommodated without having to otherwise increase the overall length of the housing 100.

A wide range of electronic components can be coupled to the mount 193 using any suitable means including adhesives, clips, mechanical fasteners, among others. In various implementations, the mount 193 is positioned within the housing 100 before any electronics are coupled to the mount 193. After the mount 193 is within the housing 100, electronics are then positioned within the housing 100 and coupled to the mount 193. Alternative implementations, however, can include coupling electronics to the mount 193, and then positioning the mount 193 with the electronics thereon into the housing 100.

To retain the mount 193 within the housing 100, an interference fit can be formed between the mount's sidewall 196 and the housing's surface 197 (FIG. 42). With this interference fit, the mount 193 can thus be engaged and retained within the housing 100 independent of mechanical fasteners. The interference fit can also help maintain good thermal conductivity between the housing 100 and the mount 193 such that there is little to no impediment to heat transfer at the mated surfaces.

A description will now be provided of an exemplary method for forming the interference fit between the mount's sidewall 196 and the housing's surface 197. First, the housing 100 can be heated (e.g., induction heated, etc.) to thermally expand the housing 100. The mount 193 and/or housing 100 can then be moved relative to one another so as to position the mount 193 within the thermally expanded housing 100. That is, the mount 193 can be moved towards the housing 100 as the housing 100 remains stationary, or the housing 100 can be moved towards the mount 193 as the mount 193 remains stationary, or both the mount 193 and the housing 100 can be moved towards each other. In any event, the relative movement between the housing 100 and the mount 193 can continue until the mount 193 abuts against the stop 194 within the housing 100. The housing 100 is allowed to cool and thermally contract against the mount's sidewall 196, thereby forming an interference fit between the housing 100 and the mount 193. Allowing the housing 100 to cool can include either or both passively allowing the housing 100 to cool and/or actively cooling the housing 100.

Alternative implementations can form the interference fit by thermally contracting the mount (e.g., by actively cooling the mount), moving the mount and/or housing relative to one another so as to position the thermally contracted mount within the housing, and then allowing the mount to thermally expand against the housing (e.g., by actively heating and/or passively allowing the mount to return to ambient temperate). In further implementations, the interference fit between the housing and the mount can be formed by using other suitable methods, such as axial press fitting and thermally conductive adhesives.

A wide range of materials can be used for the housing 100 and the mount 193. In preferred implementations, the housing 100 and the mount 193 are formed from materials such that the housing 100 and mount 193 have coefficients of thermal expansion for maintaining the interference fit therebetween across the electric machine's operating temperature range. This, in turn, allows the mount 193 to be retained within the housing 100 independent of mechanical fasteners. The selection of materials for the housing 100 and mount 193 can also depend at least in part on the thermal conductivity properties of the materials being considered.

In one exemplary embodiment, the housing 100 and the mount 193 are formed from the same material, such as aluminum, aluminum alloys, among other suitable materials. In which case, the housing 100 and mount 193 can have about equal coefficients of thermal expansion and thus thermally expand at about the same rate. Alternatively, the housing 100 and mount 193 can be formed from different materials yet still have coefficients of thermal expansion for maintaining the interference fit across the electric machine's operating temperature range.

Various implementations can also include thermal management features incorporated into the machine. For example, the housing 100 and the mount 193 can be formed from materials having good thermal conductivity properties. In addition to material selection, the interference fit between the housing 100 and the mount 193 can also help maintain good thermal conductivity between the housing 100 and the mount 193. Accordingly, these features can allow heat to be relatively efficiently transferred from the mount 193 to the housing 100 and/or to allow the mount 193 to operate as a heat sink for electronics (e.g., power electronics) coupled thereto.

The housing 100 can also include one or more external fins 198 for increased heat dissipation from the housing 100. In the illustrated embodiment, the housing 100 includes eight fins 198 each circumferentially disposed entirely around the housing 100. These fins 198 serve to increase the surface area from which heat can be dissipated from the housing 100. As shown in FIG. 42, the housing 100 includes four upper fins 198 adjacent the stator 104, and four lower fins 198 adjacent the mount 193 and electronics assembly 186.

In various implementations, the fins 198 can be arranged to optimize heat dissipation from the housing 100 for air flow in a single direction that is generally perpendicular to the axis of rotation of the rotor assembly 102. The preferred airstream velocity can be dependent on the cooling demands of the particular application.

Alternative implementations, however, can include a housing with more or less than eight fins and/or fins that do not circumferentially extend completely around the housing.

As mentioned above, the end shield 106 can be coupled to the housing 100 by an interference fit formed between the end shield's sidewall 132 and the housing's surface 136. This interference fit can help maintain good thermal conductivity between the housing 100 and the end shield 106, thereby helping with thermal management. The end shield 106 can also be formed of one or more materials (e.g., aluminum, aluminum alloy, etc.) having good thermal conductivity properties so that heat can be relatively efficiently transferred from the end shield 106 to the housing 100.

Figure 44:
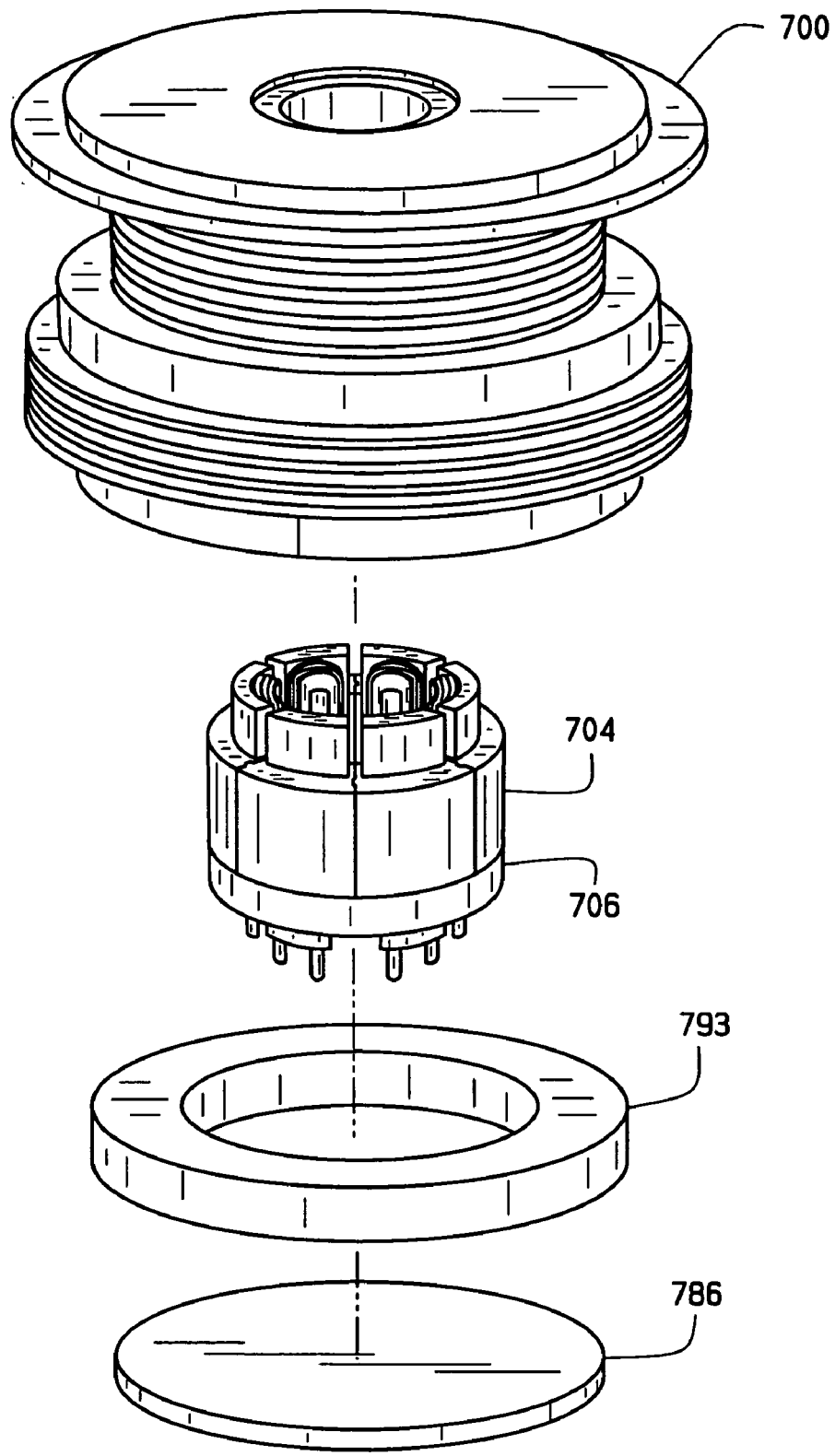
FIG. 44 is a perspective view of a rotor assembly, housing, segmented stator, end shield, electronics mount, and electronics according to an exemplary embodiment of the invention.
Figure 45:
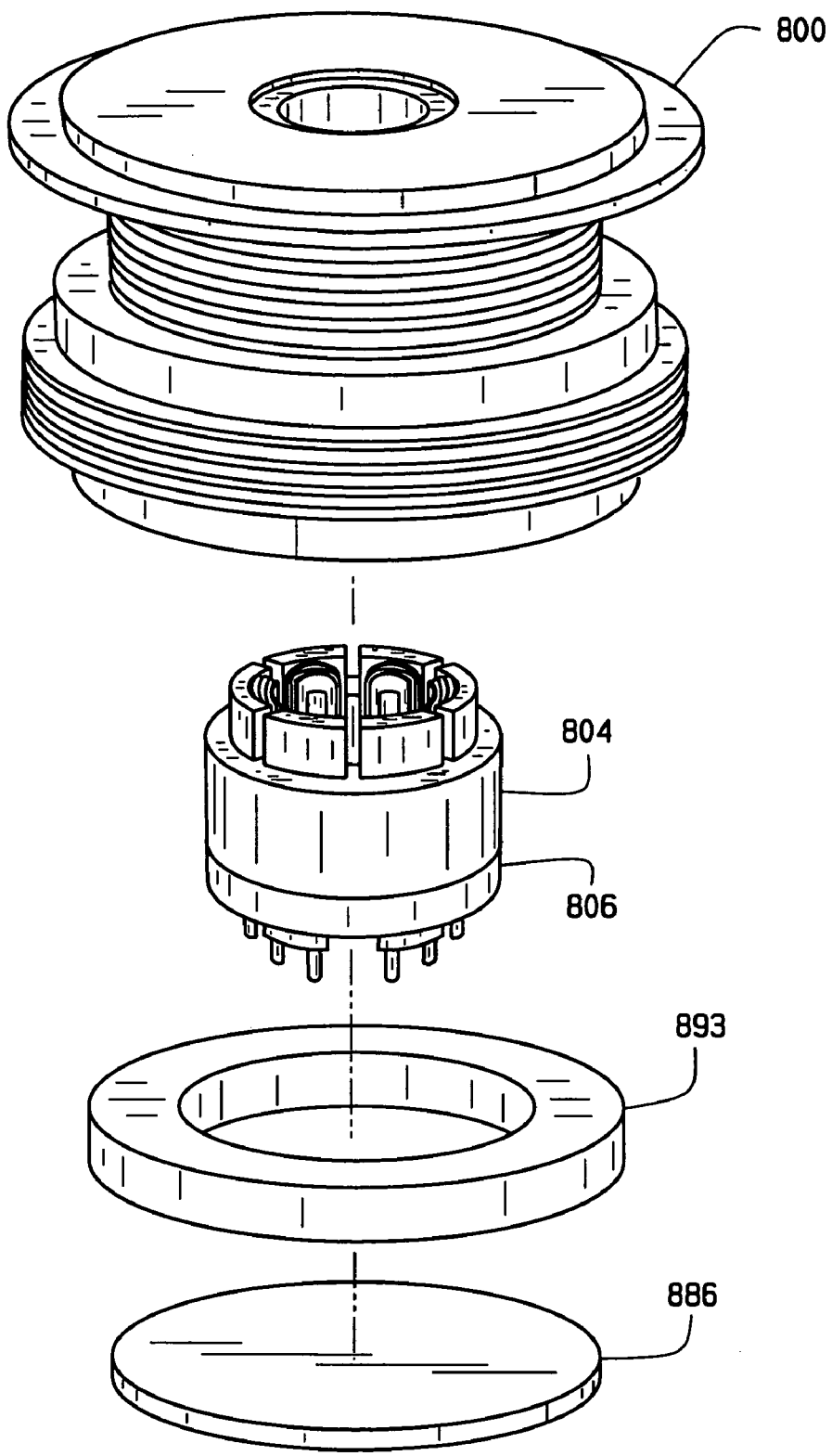
FIG. 45 is a perspective view of a rotor assembly, housing, non-segmented stator, end shield, electronics mount, and electronics according to an exemplary embodiment of the invention.

FIGS. 44 and 45 show alternative embodiments including a mount 793, 893 and power and control electronics assembly 786, 886 integrated into the primary housing 700, 800. In FIG. 44, the segmented stator 704 and end shield 706 do not include pins and tracks as described above. Likewise, the non-segmented or full round stator 804 and end shield 806 shown in FIG. 45 also do not include pins and tracks.

Accordingly, various implementations enable power and control electronics to be positioned within the same primary housing as other machine components, such as the stator, stator windings, end shield, and rotor. This, in turn, can significantly improve the manufacturability of electric machines. By eliminating the need to separately package the machine from its power and control electronics, manufacture and assembly can be streamlined with reductions in the number of discrete components, mechanical fasteners (e.g., bolts for bolting the separate housings to one another), material, and tooling.

Further, integrating the electronics into the primary housing eliminates an interface (and consequently a potential ingress for moisture) that is usually present in many existing applications between the separate housings for the power and control electronics and the machine (e.g., stator and rotor). The single unit electronics enclosure can also work to contain electromagnetic interference (EMI) fields.

In another form, the present invention provides methods of assembly electric machines. In one implementation, the housing, rotor assembly, stator, and end shield are brought together and assembled in a generally single continuous operation. That is, the housing is heated to thermally expand the housing. The rotor assembly and stator assembly (stator and end shield) can then be moved relative to the housing so that the housing can thermally contract against and form interference fits with the rotor assembly and the end shield of the stator assembly.

In some implementations, the method can also include reheating the housing to thermally expand the housing, and then allowing the housing to thermally contract against and form an interference fit with an electronics mount. This interference fit between the housing and the electronics mount can be formed at a lower temperate than that of the interference fit between the housing and the end shield and the interference fit between the housing and the rotor assembly.

The relative movement between the housing and the stator and rotor assemblies can be effectuated in various ways, including manually, via automation, and combinations thereof. One exemplary implementation uses a movable plate coupled to a pressurized source of air (e.g., an air cylinder, etc.). More specifically, the position of the stator assembly (stator and end shield) is fixed relative to the movable plate. The housing is placed over an alignment ring before, after, or as the housing is heated. The rotor assembly is then aligned above a first opening defined by the housing. The pressurized source of air is activated to cause the plate to move downward. The downwardly moving plate contacts and pushes the rotor assembly downwardly into the thermally expanded housing until the rotor assembly reaches a fixtured location. In those embodiments in which the rotor assembly includes an adaptor sleeve, moving the rotor assembly to the fixtured location also positions the adaptor sleeve within the first opening defined by the housing.

Once the rotor assembly reaches the fixtured location, the downwardly moving plate now also presses the thermally expanded housing downward over the stator assembly. In those embodiments in which the housing defines an internal stop, the housing's downward movement can continue until the stator abuts against the stop defined within the housing.

The housing is allowed to thermally contract against and form interference fits with the rotor assembly (e.g., adaptor sleeve) and the end shield. Other components can also be installed on the housing as desired, such as a volute and/or o-rings.

In various aspects, the invention provides stators, segmented stators, housings, end shields, end caps, rotor assemblies, bearing systems, adaptor sleeves, mounts for integrating power and control electronics into the primary housing, and combinations thereof. Yet other aspects of the invention include electric machines that include one or more of these components and methods of assembling electric machines. Still further aspects of the invention include electric superchargers that include bearings having steel rolling elements (e.g., steel balls or generally cylindrical steel rollers).

Various aspects of the present invention can be used in a wide range of electric machines, electric motors, electric superchargers, switched reluctance motors, brushless permanent magnet (BPM) motors, induction motors, and electric generators. Accordingly, the specific references to electric machine herein should not be construed as limiting the scope of the present invention to only one specific form/type of electric machine.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electric machine comprising a housing defining at least one stop therein, an end shield coupled to the housing, the end shield defining a plurality of pins, a segmented stator including a plurality of stator segments, each said stator segment defining at least one track, the stator segments being positioned on the end shield such that each said pin is received within a different one of said tracks, the segmented stator being captured between the end shield and the stop within the housing, each said stator segment including a first end portion abutting against the stop, the stop and the end shield restraining movement of the segmented stator relative to the housing independent of mechanical fasteners.

2. The machine of claim 1, further comprising a rotor assembly including at least one bearing having an outer race sized smaller than an opening defined by the housing, and an adaptor sleeve disposed generally around the outer race, the adaptor sleeve disposed within the opening and forming an interference fit with the housing, the interference fit securing the adaptor sleeve within the opening defined by the housing independent of mechanical fasteners.

3. The machine of claim 1, further comprising power and control electronics within the housing.

4. The machine of claim 1, further comprising a plurality of windings each including a lead end and an exit end, a plurality of end caps each coupled to a different one of said stator segments, each said end cap defining first and second grooves, each of the first and second grooves engaging one of said lead and exit ends, each said end cap guiding a corresponding pair of lead and exit ends through a different one of a plurality of openings defined by the end shield.

5. An electric supercharger comprising the machine of claim 1.

6. A vehicle comprising the electric supercharger of claim 5.

7. An electric machine comprising a housing defining at least one stop therein and an opening, a rotor assembly including at least one bearing having an outer race sized smaller than the opening defined by the housing, and an adaptor sleeve disposed generally around the outer race, the adaptor sleeve disposed within the opening and forming an interference fit with the housing, the interference fit securing the adaptor sleeve within the opening defined by the housing independent of mechanical fasteners, an end shield coupled to the housing, a stator captured between the end shield and the stop within the housing, the stator including a first end portion abutting against the stop, the stop and the end shield restraining movement of the stator relative to the housing independent of mechanical fasteners.

8. The machine of claim 7, wherein the stator is a segmented stator including a plurality of stator segments, each said stator segment having a first end portion abutting against the stop.

9. The machine of claim 7, further comprising power and control electronics integrated within the housing.

10. The machine of claim 7, further comprising at least one winding including a lead end and an exit end, and at least one end cap coupled to the stator, the at least one end cap defining first and second grooves, each of the first and second grooves engaging one of said lead and exit ends, the end cap guiding the lead and exit ends through at least one opening defined by the end shield.

11. An electric supercharger comprising the machine of claim 7.

12. A vehicle comprising the electric supercharger of claim 11.

13. The electric supercharger of claim 11, wherein the bearing includes a plurality of steel rolling elements.

14. An electric machine comprising a housing, power and control electronics within the housing, an end shield coupled to the housing, the end shield defining at least one opening therethrough, a stator within the housing, at least one winding including a lead end and an exit end, and at least one end cap coupled to the stator, the at least one end cap defining first and second grooves, each of the first and second grooves engaging one of said lead and exit ends, the end cap guiding the lead and exit ends through the at least one opening in the end shield for connection to one or more of the power and control electronics.

15. The machine of claim 14, wherein the power and control electronics are coupled to a mount forming an interference fit with the housing, the interference fit securing the mount and the power and control electronics within the housing independent of mechanical fasteners, the mount operating as a heat sink for one or more of the power and control electronics.

16. The machine of claim 14, wherein the stator is a segmented stator including a plurality of stator segments.

17. The machine of claim 14, wherein the housing defines at least one stop therein, and wherein the stator is captured between the end shield and the stop within the housing, the stator including a first end portion abutting against the stop, the stop and the end shield restraining movement of the stator relative to the housing independent of mechanical fasteners.

18. The machine of claim 14, further comprising at least one track defined by one of the stator and the end shield, at least one pin defined by the other one of said stator and said end shield, the pin being slidably received within the track to at least inhibit relative rotational movement between the stator and the end shield.

19. The machine of claim 14, further comprising a rotor assembly including at least one bearing having an outer race sized smaller than an opening defined by the housing, and an adaptor sleeve disposed generally around the outer race, the adaptor sleeve disposed within the opening and forming an interference fit with the housing, the interference fit securing the adaptor sleeve within the opening defined by the housing independent of mechanical fasteners.

20. An electric supercharger comprising the machine of claim 14.

21. A vehicle comprising the electric supercharger of claim 20.

* * * * *